F. A. HART.
COMBINED TYPE WRITING AND COMPUTING MACHINE.
APPLICATION FILED JAN. 8, 1916.
1,285,150. Patented Nov. 19, 1918.
7 SHEETS—SHEET 1.
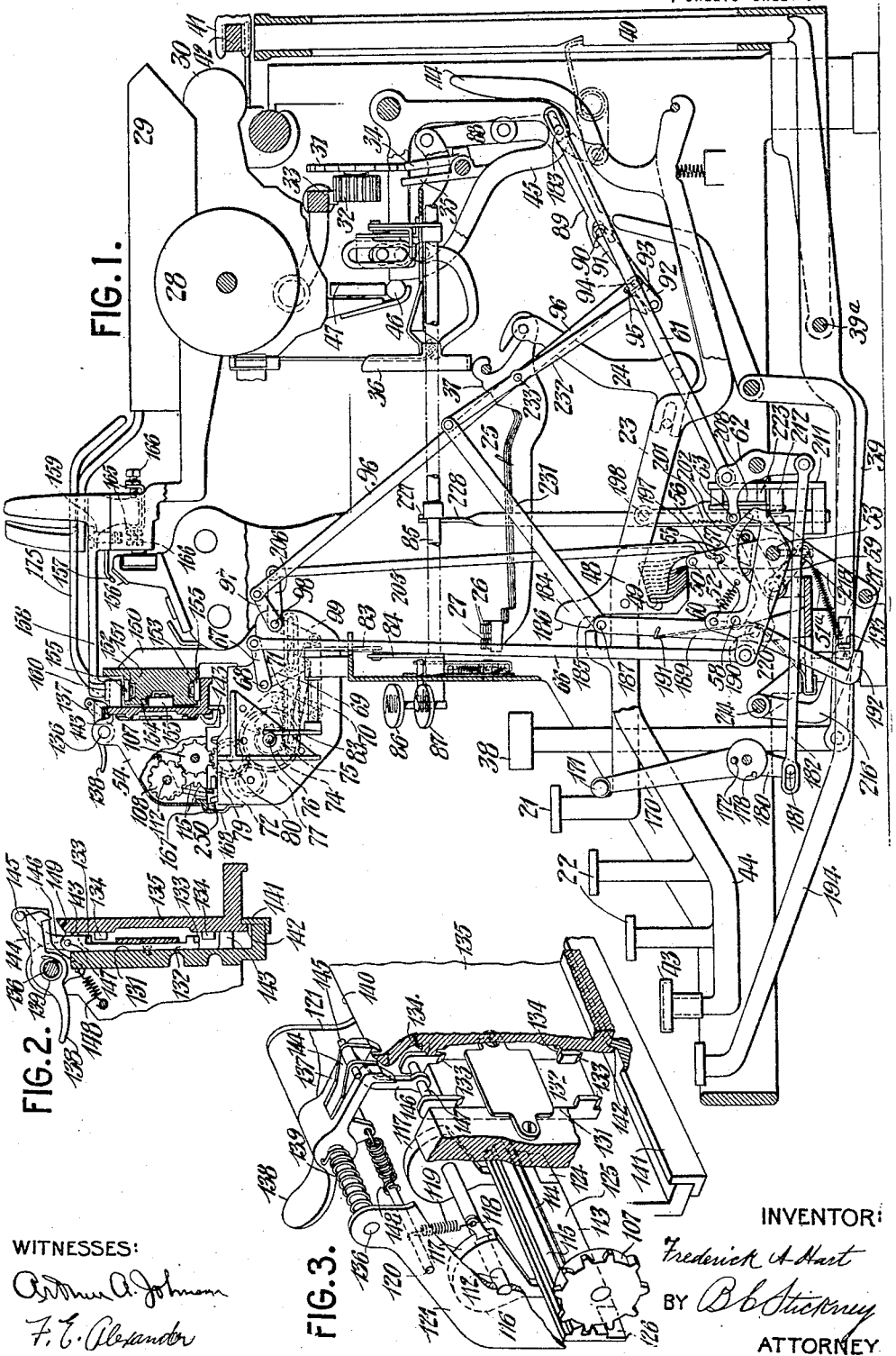
WITNESSES:
Arthur A. Johnson
F. E. Alexander
INVENTOR:
Frederick A. Hart
BY B.B. Stickney
ATTORNEY

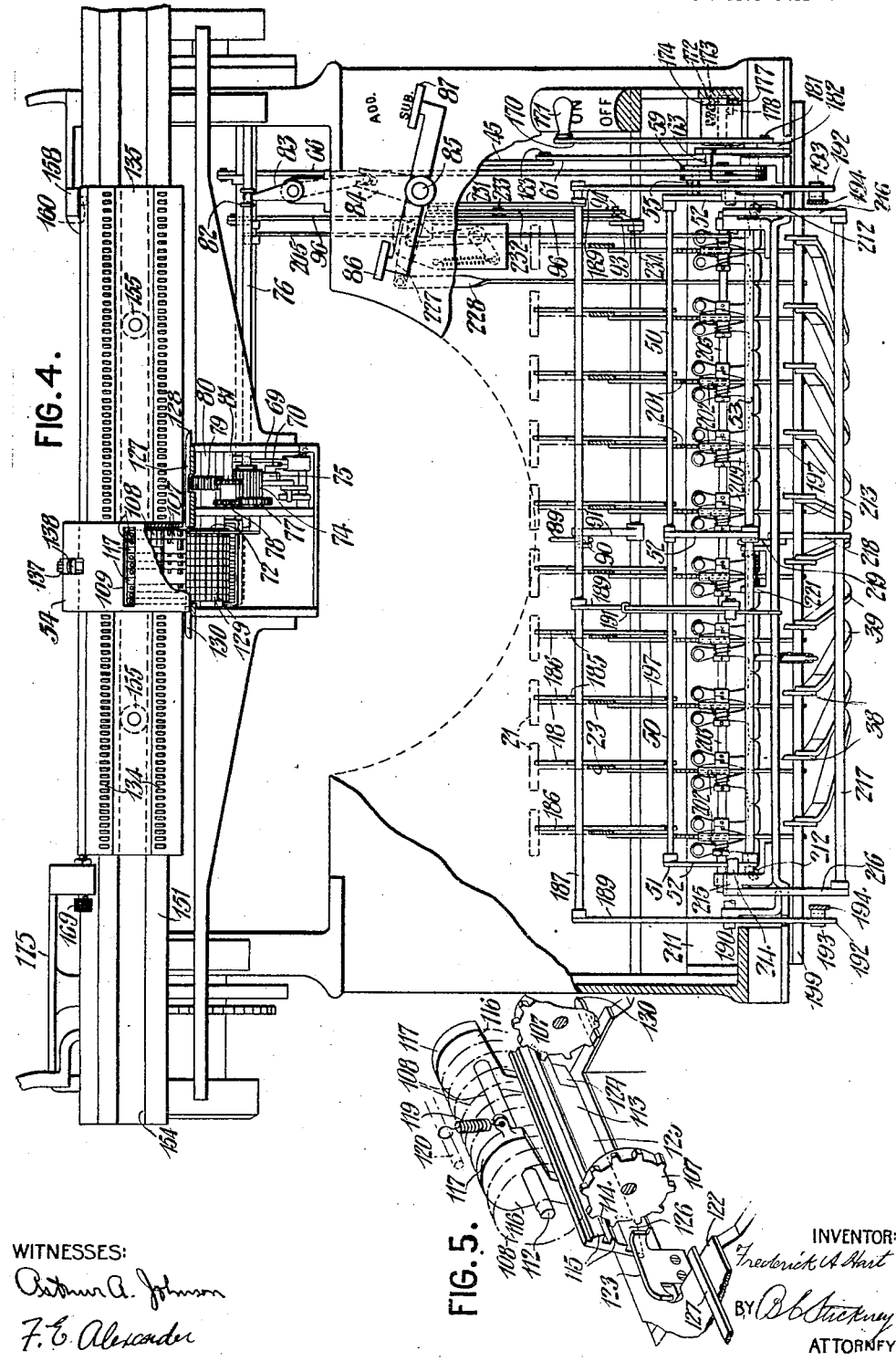

F. A. HART.
COMBINED TYPE WRITING AND COMPUTING MACHINE.
APPLICATION FILED JAN. 8, 1916.
1,285,150.
Patented Nov. 19, 1918.
7 SHEETS—SHEET 3.
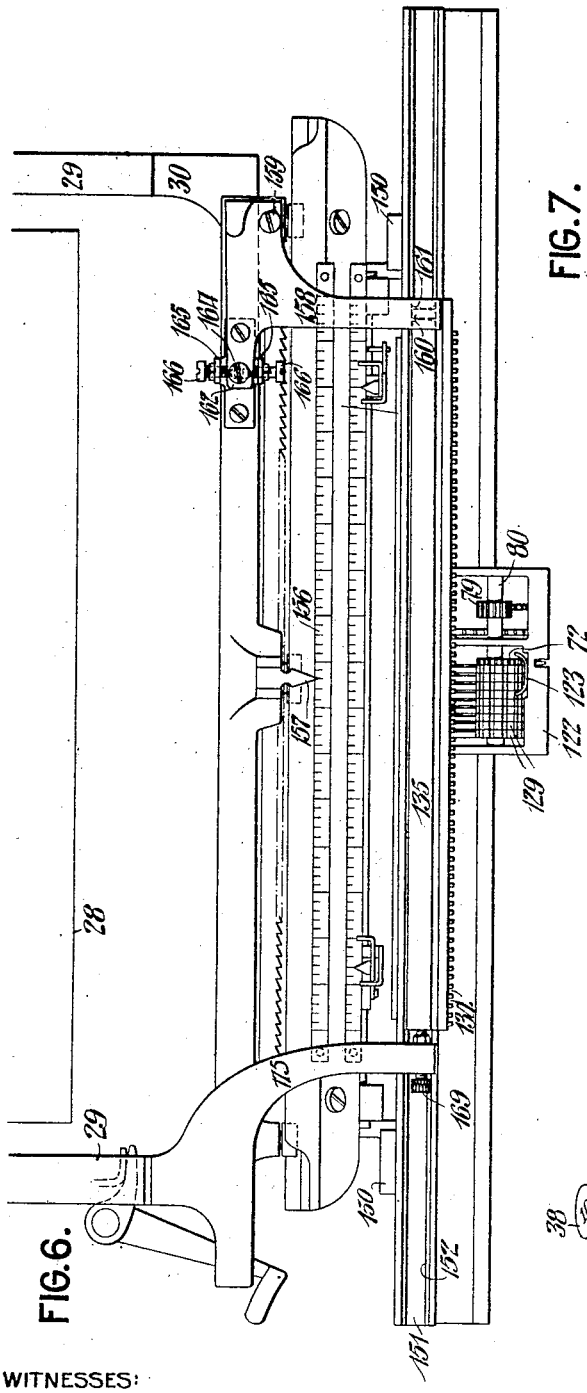
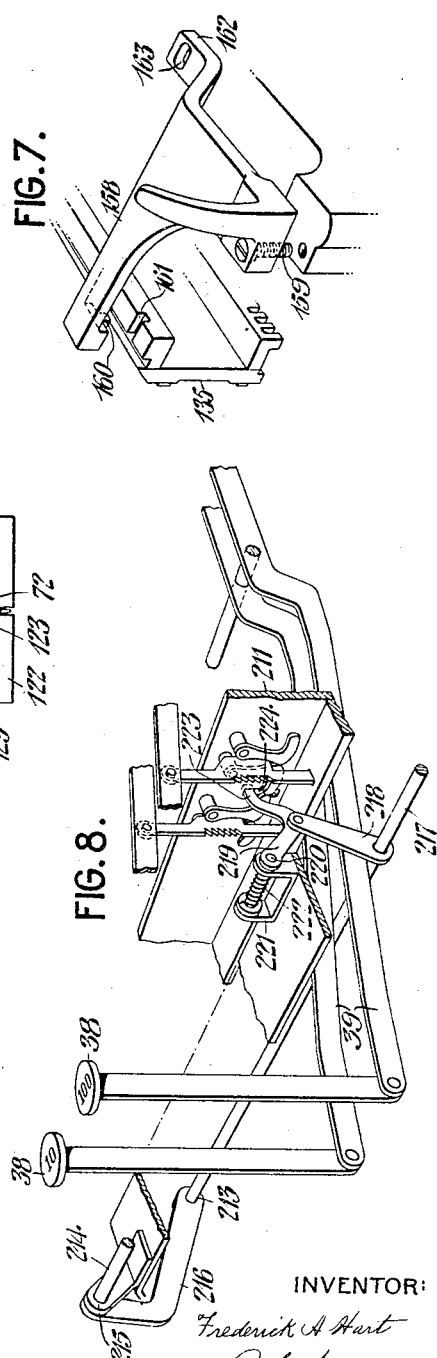
WITNESSES:
Arthur A. Johnson
F. C. Alexander
INVENTOR:
Frederick A. Hart
BY B. C. Stickney
ATTORNEY.

F. A. HART.
COMBINED TYPE WRITING AND COMPUTING MACHINE.
APPLICATION FILED JAN. 8, 1916.
1,285,150.
Patented Nov. 19, 1918.
7 SHEETS—SHEET 4.
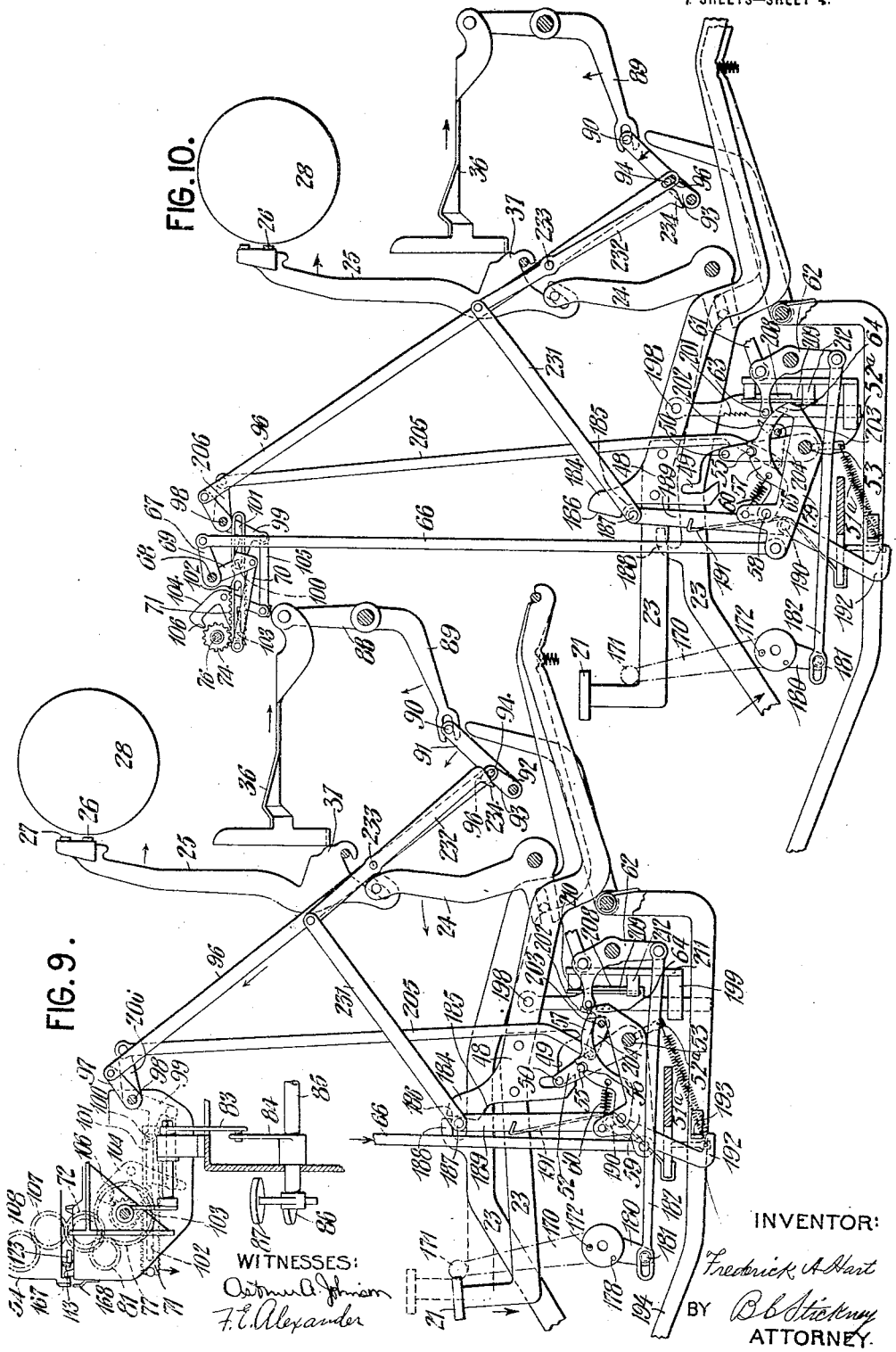
INVENTOR:
Frederick A. Hart
BY B. C. Stickney
ATTORNEY.
WITNESSES:
Arthur A. Johnson
F. E. Alexander F. A. HART.
COMBINED TYPE WRITING AND COMPUTING MACHINE.
APPLICATION FILED JAN. 8, 1916.
1,285,150.
Patented Nov. 19, 1918.
7 SHEETS—SHEET 5.
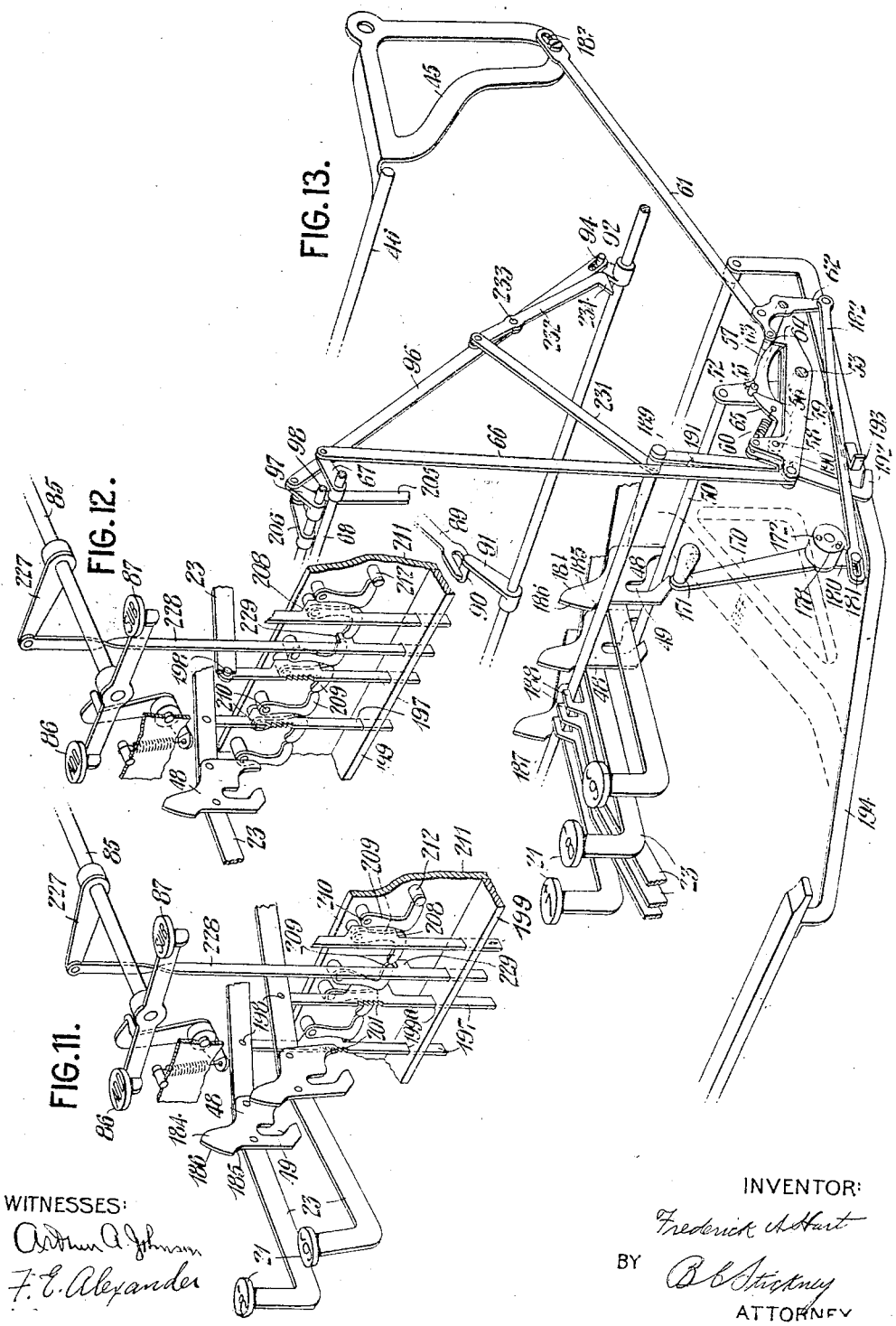

F. A. HART.
COMBINED TYPE WRITING AND COMPUTING MACHINE.
APPLICATION FILED JAN. 8, 1916.
1,285,150. Patented Nov. 19, 1918.
7 SHEETS—SHEET 6.
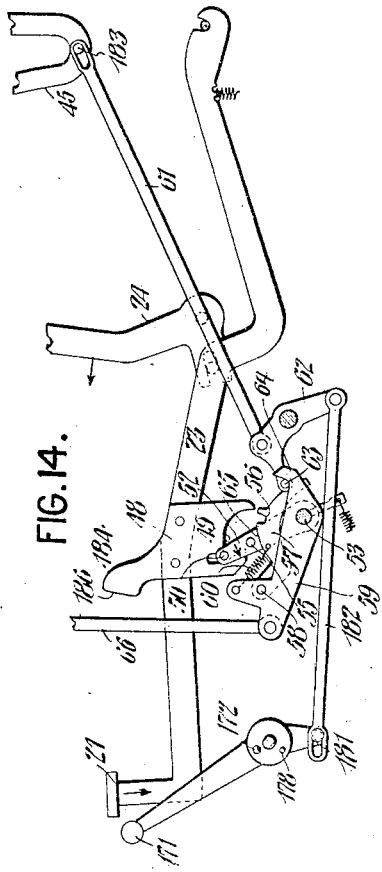
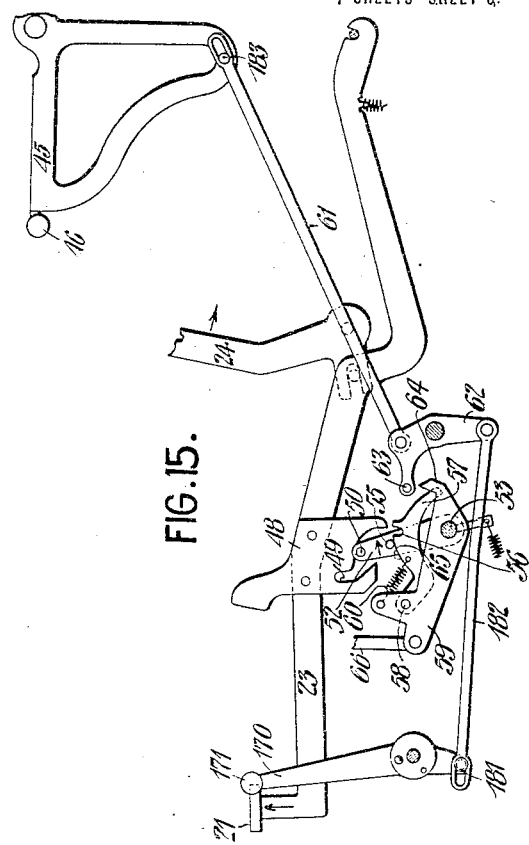
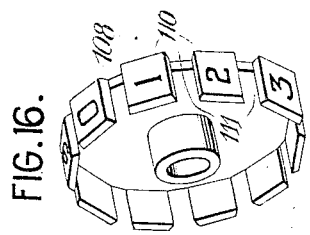
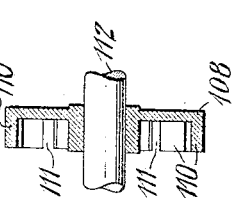
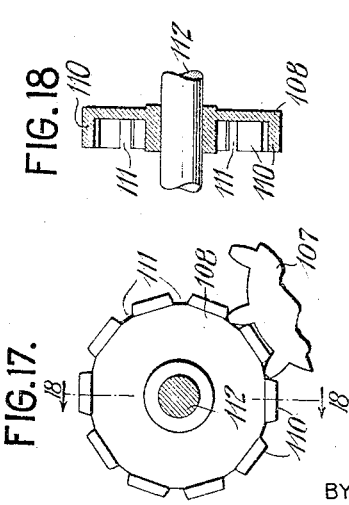
WITNESSES:
INVENTOR:
Frederick A Hart
BY
ATTORNEY F. A. HART.
COMBINED TYPE WRITING AND COMPUTING MACHINE.
APPLICATION FILED JAN. 8, 1916.
1,285,150.
Patented Nov. 19, 1918.
7 SHEETS—SHEET 7.
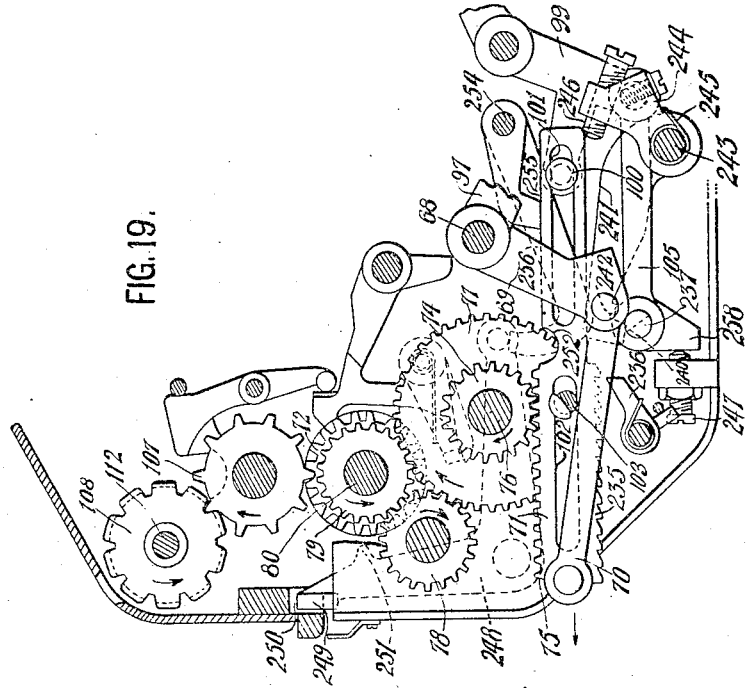
WITNESSES:
Arthur A. Johnson
F. E. Alexander
INVENTOR:
Frederick A. Hart
BY D. C. Stickney
ATTORNEY.

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,285,150.  Specification of Letters Patent.  Patented Nov. 19, 1918.

Application filed January 8, 1916. Serial No. 70,898.

*To all whom it may concern:*

Be it known that I, FREDERICK A. HART, a citizen of the United States, residing in Newark, in the county of Essex and State of New Jersey, have invented certain new and useful Improvements in Combined Type-Writing and Computing Machines, of which the following is a specification.

This invention relates to computing machines, and more particularly combined typewriting and computing machines in which the numeral keys of a typewriter control the computing devices, and includes improvements on the application of Henry L. Pitman, Serial No. 24,390, filed April 28, 1915.

The object of my invention is to improve such machines generally, enabling them to be operated with ease, accuracy, and at high speed, and without excessive wear of the parts.

The machine as herein disclosed is provided with dial-wheels and a master-actuator therefor, controlled as to its movement by the keys and in accordance with the digital values represented thereby. The carriage of the typewriter is employed to determine the denomination of the computing mechanism, which, at any moment, is under control of a key. Step-by-step movement of the carriage is effected by the usual escapement mechanism common to typewriters. Pressure on the numeral keys is transmitted to the actuator to move the same different distances by suitable connecting devices. Since it is not desirable to operate the computing mechanism when printing in upper-case characters, provision is made by which the connection between the numeral keys and the computing mechanism is interrupted on operation of the case-shift key. This is brought about by a connector normally completing the said connections, but moved to break such connections by the case-shift key. The actuating device for the computing mechanism is shiftable into and out of engagement therewith. State-controlling mechanism is employed to set the computing mechanism for addition or subtraction, and such state-controlling mechanism also serves to control a bichrome mechanism, whereby the printing of different items may be produced in different colors. There are also provided the usual alphabet and space keys, and tabulator keys for jumping the typewriter carriage.

A feature of my invention relates to the means by which the keys transmit their movement to an oscillating member adapted to be moved different distances by said keys, and consists in providing a series of differentiator cams on the keys having open slots to embrace said oscillating part, the oscillating part or oscillator being spring returned to normal position, the construction permitting the keys and oscillator to return independently to normal position after a key stroke, thereby giving an easy action to the key.

Another feature of my invention relates to the construction and mounting of the connector above referred to. In my improved construction, I pivot the connector on a rocking lever at a point such that the driving action from the oscillator is in a direct line with said pivotal point of the connector. The connection between the oscillator and the connector is in the form of a pin seated in a slot in the connector, and by having the drive from said pin substantially in a direct line with the pivot of the connector, the wall of said slot may be made substantially at right angles to the line from said pivotal point, so that the connector will have no tendency to be cammed out of connection with said pin during driving action of the oscillator, while at the same time very little force will be required to disconnect the connector from said pin, when said force is properly applied.

Another feature of my invention relates to the manner of attaching the means for holding the connector to its work. In the present instance I have provided a spring which is attached directly to the rocking lever, on which the connector is pivoted. Since during the driving action of the keys, the connector and rocking lever move as a single piece, when the spring is connected as above described, there is no change in the tension of said spring during the driving action. Since the connector is moved out of engaging relation with the oscillator through the medium of the shift key of the typewriter, it is desirable that said key have as little burden placed upon it as possible, and by connecting the spring as above described, said spring may be made comparatively weak.

Another feature of my invention relates to the manner of control of the actuator for the computing mechanism, to determine its periods of activity or non-activity thereon. In the present instance I use a part of the escapement mechanism of the typewriter to furnish the power for disengaging the actuator from the computing mechanism, but the connection from the said part is normally ineffective. On depression of a numeral key, however, the said connection is rendered effective. In the particular embodiment shown, I provide an interponent adapted to be moved by the numeral keys only, said interponent normally standing out of position to be moved by a part of the escapement. The first part of a depression of a numeral key, however, is used to move said interponent into the path of said part of said escapement mechanism, so that upon the complete depression of the numeral key and the actuation of the escapement mechanism, the connections to the actuator are established, and said actuator is moved out of engagement with the computing mechanism. This disengagement, however, does not take place until the actuator has fully operated the computing mechanism.

Another feature of my invention relates to safety-devices to prevent any improper operation or interference of parts during the time a numeral key is being depressed and computation performed. Said safety-devices take the form of locks, which prevent any movement of the carriage while a numeral key is being depressed, and also any movement of any of the alphabet keys, or the space key, to cause any displacement of the escapement dogs during such operation of a numeral key. In this connection I employ a locking bar adapted to swing under hooks on the alphabet keys and provide a nose on each differentiator cam for directly engaging said bar to lock the alphabet keys. A lever swinging with said bar carries a hook to engage a lug on the space bar lever to lock the space bar.

Another feature of my invention relates to the support for the computing mechanism or totalizer, and in the specific embodiment shown comprises a latching means for holding the totalizer on its support and preventing lateral movement thereof, said latch also controlling means for engaging said support to prevent longitudinal shifting of the totalizer on its support.

Another feature of my invention relates to the connections between the typewriter carriage and the totalizer support. In the form of my invention as disclosed, I provide a totalizer support, so mounted as to move in exact parallelism with the computing mechanism actuator shaft, and provide connecting means between the typewriter carriage and said support in the form of arms loosely embracing the support. By this means the accurate travel of the totalizer past its actuating means is assured, even though the path of travel of the totalizer and that of the typewriter carriage are not exactly parallel. This feature of my invention is also directed to the adjustment of the arms above referred to.

Another feature of my invention relates to the provision of a locking bail, whereby the wheels of the totalizer are held against displacement when the totalizer is out of the computing zone. This feature also includes the provision of decimal-spacing collars carried by the totalizer shaft, and a connection between said collars and said locking bail.

Another feature of my invention relates to the construction of the dial-wheels themselves, and, as disclosed, these wheels have faces which take the form of blocks having numerals thereon, said blocks being so shaped as to be engaged and driven by a toothed driving wheel.

Another feature of my invention relates to interlocking mechanism between the numeral and tabulator keys, and in this instance comprises a series of hinges adapted to prevent simultaneous depression of two keys, and a member movable between two of the hinges, brought into operation on depression of a tabulator key.

Another feature of my invention relates to color printing in the computing zone, under control of the numeral keys. This result is brought about by arranging the state-controlling mechanism to be moved to one extreme position or the other, so that the computing mechanism is set either for addition or for subtraction. A ribbon-shifting mechanism, connected to said state-controlling mechanism, insures the printing of the item in the color corresponding to the state desired. In order to print with the numeral keys in either color in the computing zone, I provide a disconnecting mechanism for the computing mechanism, which is independent of the ribbon-shifting mechanism. This disconnecting mechanism takes the form of a manually operable lever, arranged to disconnect the connector in a manner similar to that performed by the case-shifting mechanism, hereinbefore referred to.

Another feature of my invention relates to an interlock between the ribbon-shifting mechanism and the numeral keys. With a state-controlling mechanism connected to the ribbon-shifting mechanism, and which is not designed to occupy a neutral position, it is important that there be no chance of a numeral key being depressed while said ribbon is being shifted. I therefore provide means for preventing the keys from being operated while the ribbon is being shifted, said means becoming ineffective in respect to said keys on the ribbon-shifting mechanism reaching its completely shifted position. In the particular embodiment shown, I employ the hinges, which are used to prevent the simultaneous depression of two numeral keys. The ribbon-shifting mechanism operates a part which moves between two of said hinges during the shifting of said mechanism, but passes out of engagement with said hinges on the ribbon being completely shifted.

Other features and advantages will hereinafter appear.

In the accompanying drawings,

Figure 1 is a sectional side view, showing, in a general way, the combined typewriting and computing mechanism.

Fig. 2 is an enlarged view of the mechanism for mounting the totalizer on its carriage, said mechanism being shown in unlocked position.

Fig. 3 is a view in perspective, showing the totalizer-attaching mechanism and universal locking bar for the totalizer computing wheels, parts being broken away for clearness.

Fig. 4 is a front view showing, in a general way, the combined typewriting and computing mechanism, with parts broken away for clearness.

Fig. 5 is a skeleton detail view, in perspective, showing the universal locking bail for the totalizer computing wheels in ineffective position when the totalizer is in mesh with the computing mechanism.

Fig. 6 is a fractional plan view of the typewriter and the totalizer carriage, showing the adjusting mechanism for the latter.

Fig. 7 is a fractional distended perspective view of the connection of the totalizer carriage to the typewriter carriage, as seen at the right end of Fig. 6.

Fig. 8 is a fractional skeleton view, in perspective, showing the means for locking the numeral keys on the depression of a tabulator key.

Fig. 9 is a side view showing the action of a numeral key and its associated parts near the end of the down stroke of said key.

Fig. 10 is a side view showing the action of the parts shown in Fig. 9 at the depression of an alphabet key.

Fig. 11 is a perspective view showing the depression of a numeral key when the state-controlling lever of the computing mechanism is in adding position.

Fig. 12 is a similar view to Fig. 11, showing the locking of a numeral key when the state-controlling levers are in a midway position.

Fig. 13 is a fragmentary skeleton view, in perspective, showing the manual disconnecting lever and its associated parts, and the connections from the numeral keys and platen-shift frame to the computing mechanism.

Fig. 14 is a fragmentary diagrammatic side view, showing the idle action of the oscillator at the depression of a numeral key when the computing mechanism has been disconnected from the typewriter.

Fig. 15 is a fragmentary diagrammatic side view, similar to Fig. 14, showing the action of the parts on the return stroke of a numeral key, the disconnecting mechanism having been returned to effect a connection between the computing mechanism and the typewriter.

Fig. 16 is a detail perspective view of one of the dial wheels.

Fig. 17 is a side view of the same, in normal position, showing its meshing relation to one of the secondary computing wheels.

Fig. 18 is a sectional view of the same, taken on the line 18—18 of Fig. 17.

Fig. 19 is a fragmentary sectional view, with the various parts in the positions which they will occupy, with the numeral key proceeding on its down stroke near the end thereof.

Fig. 20 is a skeleton perspective view of the lock for the totalizer which prevents the travel thereof while the master wheel is being driven.

Fig. 21 is a skeleton perspective view of the mechanism for shifting the driving rack to the train of gearing for the master wheel out of mesh with the intermediate barrel gear which it drives, the motion being a parallel-link motion, with provision for locking the rack in its disengaged position until it has completely returned to its home position.

Numeral keys 21 and alphabet keys 22 depress key-levers 23 to rock bell-cranks 24 to swing type-bars 25 upwardly and rearwardly to cause type 26, 27, thereon to print on the front side of a cylindrical platen 28 journaled on a platen frame 29 which is mounted on the traveling typewriter carriage 30 (Fig. 1). The carriage is constantly under the tension of a spring barrel (not shown), which tends to move the carriage in letter-feeding direction, said motion taking place at each depression of a character key or space key. The carriage is controlled in its step-by-step letter-feeding motion by the usual escapement wheel 31, associated with a pinion 32 meshing with a rack 33 connected to the typewriter carriage 30. To permit the escapement wheel to turn, dogs 34 and 35 are rocked at each depression of a key by a universal frame 36 which is moved rearwardly by a heel 37 on each type-bar, which strikes the universal frame each time the type 26, 27 prints on a work-sheet carried by the platen.

Jump movements of the carriage 30 may also be obtained in addition to the step-by-step movements, for the purpose of rapidly positioning the typewriter carriage in and at a computing zone. For this purpose, the machine may be provided with the usual Underwood decimal tabulating mechanism, which includes keys 38 mounted on the front ends of key-levers 39, which are pivoted intermediate their ends at 39ª. The rear end of each lever 39 is connected to raise its plunger 40 into the path of one of a plurality of stops 41 mounted on a rack bar 42, said stops being adjustable at letter-space intervals along the rack-bar which forms part of the typewriter carriage 30. At the raising of any of the plungers 40, the rack-bar 33 is disconnected from its pinion 32 by the usual carriage-release mechanism, indicated in Fig. 1 by dotted lines, thus releasing from the letter-feed escapement mechanism the carriage 30, which is rapidly drawn in letter-feed direction until arrested by one of the stops 41 thereon striking against the raised plunger or counter-stop 40.

The type-bars 25 for the keys 21 and 22 are each provided with two sets of types 26 and 27, so that they control selectively the writing of two different characters. On the numeral keys the digit types 26 are usually placed to print in lower-case position, while other characters are printed by the upper-case type 27. To effect the change from normally writing lower-case characters to writing upper-case characters, the platen 28 is mounted to be shifted from a lower-case position to an upper-case position. For this purpose, there is provided a shift key 43 on a lever 44, the rear end of which engages a shift frame 45, pivoted on the framework of the typewriter, and provided with a horizontal rail 46 on which rests a roller 47 mounted on the platen frame 29. On depression of said shift key, the rail 46 is caused to move upwardly, thus raising the platen frame 29 to bring the printing line of the platen 28 opposite the upper-case type 27 on the type-bars 25 when the latter are swung to their printing position.

The above-described mechanism is substantially that found in the usual Underwood standard typewriting machine.

The indexing mechanism for determining the extents of computing actions to accord with the digital values of the numeral keys as actuated, is connected, at least in part, directly to the numeral keys. For this purpose, there is provided on each of the numeral-key-levers 23 from "1" to "9," a differentiator 48 (Figs. 1 and 3). The differentiators are each shown in the form of a plate attached to the key-lever, and having a cam slot 49 open at its lower end. The cam slots register with a rail 50 universal to all of the differentiators 48, said rail 50 forming the cross piece of a bail having arms 52 mounted on a rock shaft 53. The bail 51 may be considered part of the differential mechanism, and inasmuch as it is oscillated varying amounts, depending on the digital value of the key operated, it may be termed an oscillator. The general form of the connections between the keys and the computing mechanism is somewhat like that shown in the co-pending application of Henry L. Pitman, Serial No. 24,390, heretofore referred to, but differs therefrom in several particulars, which will be pointed out. The differentiators, instead of having the cam slots formed in such a manner as to move the rail 50 positively in both directions, as in said application above referred to, have in this instance the cam slots almost entirely open at the bottom, and for the purpose of moving the oscillator back to normal position, a spring 51ª, attached at 52ª to one of the arms 52, is provided. By this construction, the oscillator may return to its normal position under action of its spring as soon as the key returns toward normal position an amount sufficient to permit the rail 50 to clear the upper portion of the slot 49 (Fig. 13). It will, therefore, be seen that the key and oscillator may return to normal position independently of each other.

The differentiators not only differ from the application above refered to in the formation of the cam slots carried thereby, but also in the fact that in the present case each differentiator is provided with a nose at its upper portion to operate safety-devices, to be described later.

The oscillator 51 forms one element in a driving train to one or more totalizers or computing mechanisms 54, so that numbers may be run thereinto as said numbers are printed at the actuation of the numeral keys 21. The connections from the oscillator 51 to the computing mechanism comprise a connector movable into and out of driving relation in respect to the oscillator 51, as in said application above referred to, but the form and mode of mounting the connector differ from that shown in said application. The oscillator 51 is provided with a pin 55 on one of its arms 52, said pin 55 being adapted to engage a notch 56 formed in the connector 57. The wall of the notch 56, against which the pin 55 drives, is substantially radial with respect to the pivot 53 of the oscillator 51, and the pivot 58 of said connector is in the direct line of drive of the pin 55, in this respect differing from the construction of the application above referred to. The connector 57 is pivoted to a rocking member 59, loosely mounted on the shaft 53, and a spring 60 for holding the connector to its working position is attached to said rocking lever 59. By reason of the fact that the spring 60 is so attached, it follows that when the oscillator 51 is rocked from the position shown in Fig. 10, there is no change in tension of the spring 60, since the connector 57 and rocking lever 59 move as one piece. The rocking lever 59 is connected by a link to the computing mechanism in a manner similar to that shown in the application referred to. By reason of the fact that the connector 57 is pivoted on the rocking lever 59 at a point 58, directly in line of thrust of the pin 55, there is no camming action of the pin 55 on the connector 57, tending to disengage the latter from the pin, and, hence, the spring 60 need not be as strong as would be required if the driving action were not in a straight line between the pin 55 and the pivotal point 58. Owing to the fact also that the spring 60 is attached to the lever 59, and not to the link 66, as in the construction of the prior application, there is no change in tension of the spring during the rocking movement of the lever 59, and, for this additional reason, the tension of the spring 60 need not be so great. The fact that a comparatively weak spring can be used at this place is important in view of the fact that the connector 57 is disengaged from the pin 55 when computing upper-case characters, and such disengagement is effected through the medium of the shift key and against the tension of the spring 60.

The means for controlling the operativeness or inoperativeness of the connector 57 through the medium of the shift key is brought about by means substantially like those described in the said application and are as follows:—The shift frame 45 is connected by a link 61 to a bell-crank 62 having a pin 63 overlying one end of the connector 57. When the shift frame 45 is rocked to permit the writing of upper-case characters, the finger 63 will depress the connector 57, so that the notch 56 will clear the pin 55, thereby disconnecting the oscillator, and hence the numeral keys, from the totalizer and other computing mechanism operated by the lever 59. The lever 59 is provided with an extension 64, (Figs. 10, 13, 14 and 15), above, and out of the path of which the pin 63 normally stands (Fig. 1). When the bell-crank 62 is actuated to disconnect the computing mechanism from the numeral keys, the pin 63, when depressing the connector 57, will pass in front of the projection 64, as in Fig. 14, which limits the motion of the bell-crank 62, and also holds the lever 59 against accidental actuation during the idle forward stroke of the oscillator 51, since said oscillator may have a tendency, during its idle motion, to move the lever 59, if the pin 55 on the oscillator should cause friction by contact with the surface 65, in case the connector 57 has not been fully depressed when the computing mechanism is disconnected from the typewriter, which may occur during the rapid operation of the machine.

In order to avoid stalling the machine during said rapid operation, the notch 56 in the connector 57 is formed, as previously stated, to permit the pin 55 to pass out of said notch onto the surface 65 when the shift key of the typewriter has not been fully depressed at the beginning of the down stroke of a numeral key, at which time the pin 55 will cam down the connector 57 to allow the oscillator to swing and the numeral key to be depressed. In a slower operation of the machine the shift key will be fully depressed before a numeral key is actuated, at which time the connector 57 will be fully depressed before the actuation of the oscillator, and will be swung clear of the pin 55, permitting the oscillator to swing freely without any friction on the connector 57.

If, during a rapid operation of the typewriter, the shift key should be released to bring the platen back to lower-case position before a numeral key has completed its up stroke, the bell-crank 62 will reach its normal position before the pin 55 has come into register with the notch 56, at which time the connector 57 will be released, and under the influence of the spring 60 its surface 65 will be forced against the pin 55 until said pin has reached its normal position, when the connector 57 will snap up into its normal position, with its notch engaging the pin 55 ready for the next computation.

When the connector 57 straddles the pin 55 with its notch 56, then the movements of the oscillator 51 are transmitted to the lever 59, to transfer these movements to the actuating mechanism of the computing head or totalized 54. The lever 59 is pivotally connected to a link 66, which is arranged to oscillate an arm 67 secured to a rock shaft 68 (Figs. 1, 4, 10 and 13). Connected to rock with the shaft 68, is a second arm 69 (Fig. 10), which is connected by a link 70, to the forward end of a driving rack bar 71, which forms a part of the actuating mechanism. By the means above described, the keys transmit their movements to the rack 71 in accordance with their digital values.

When a numeral key 21 has completed its digit-determining movement in a computation, the rack bar 71 will have completed its driving movement forward and hence its computation, so that during the remainder of the down stroke of the numeral key, the teeth 75 can be disengaged from the pinion 74 to permit an idle return movement of the rack bar 71 to its normal position.

The manner of disconnecting the rack 71 and the pinion 74 differs in this application from the mode described in the co-pending case above referred to. In said co-pending case, the connection was such that each time the universal space bail was depressed, whether by a numeral key or otherwise, the rack 71 was moved out of engagement with the pinion 74. It is advantageous, however, to reduce the unnecessary movements of the driving rack and connected parts to avoid wear thereof, and to ease the action of the keys, and hence, in this case, the rack 71 is not moved out of engagement with the pinion 74, except when a numeral key is operated, and to carry out this mode of operation, there is provided a rearwardly extending link 231, which is pivotally mounted near the right end of the universal alphabet key-locking bar 187 (Figs. 1, 4, 9, 10 and 13), the rear end of which is pivoted to the upper end of an interponent lever 232 pivoted at 233 to a link 96, the lower end 234 of said interponent being normally out of the path of a pin 94 (Figs. 1, 10 and 13), so that said pin may idly move upwardly in its slot 95 without transmitting motion to the link 96 at the actuation of the typewriter escapement mechanism, the driving rack 71 remaining motionless and in mesh with its associated gear 74 during said actuation of the typewriter escapement mechanism.

When, however, a numeral key is depressed, the alphabet key-locking bar 187 is swung forwardly, carrying therewith the link 231 to swing the interponent 232 about its pivot 233 to bring its lower end 234 into the path of the pin 94 during the early part of the down stroke of said numeral key, thus enabling the motion transmitted to the typewriter escapement mechanism by the heel 37 of the type-bar to be transmitted to thrust the link 96 upwardly to depress the driving rack 71 and draw it out of mesh with its associated gear 74, the action of the parts being so timed that the interponent 232 is moved into effective position before the parts of the typewriter carriage escapement mechanism are actuated. At the end of the return stroke of the numeral key, the universal locking bar 187 is returned to its normal position, and carries therewith the interponent 232 to its normal Fig. 10 position.

The movement of the link 96 by the pin 94 is effected from the swinging frame 88 provided with a downwardly extending arm 89 (Figs. 1, 4, 9 and 10), which is bifurcated to loosely engage a pin 90 on one arm 91 of a bell-crank lever 92, the other arm 93 of which carries said pin 94.

The link 96 (Figs. 10 and 13) is connected to swing an arm 97 on a rock shaft 98, to which is also secured a forked arm 99 (Figs. 19 and 21), carrying a pin 100 at one of its forks, which engages in a slot 101 provided in the rack bar 71 (Fig. 19). A second slot 102 is provided, which is engaged by a pin 103 on a double bell crank 104 (Figs. 10 and 21), one arm of which is connected by a link 105 to the other fork of the arm 99. It will thus be seen that this provides a parallel motion, whereby when the shaft 98 is rocked at the backward movement of the universal frame 36, at the end of a key stroke, the rack bar 71 will be moved bodily downward, in a horizontal position, out of mesh with the gear 74, at which time a detent 106 on the bell crank 104 will engage the gear 79 to hold the latter against rotation during the idle return movement of the driving rack 71, which is held in its depressed position until it has reached the limit of its return motion, during which time the depressed numeral key will have returned to its normal position.

In order that the rack bar 71 may return the full distance, there is provided a full-stroke mechanism including a rack 235 on the bar 71, having ratchet teeth facing their abrupt sides to the left to be engaged by a spring-pressed pawl 236, which will permit movements of the rack bar 71 to the right but will prevent movements to the left. Normally, when the rack bar 71 is in its raised position, it is free and clear of the pawl 236, so as not to be interfered with thereby, but when in its depressed position, it comes into engagement with the pawl 236, which latter forms with the rack 235, a full-stroke mechanism. The full-stroke mechanism would not be complete, however, if the rack 71 could move to its upper position before it finished its stroke. To avoid sucn premature movement, a pin 237, which pivotally connects the link 105 with the arm 238 of the double bell crank 104, has an extension 239 (Figs. 19 and 21), which is cut away to form a sharp angle 240.

When the parallel linkage is in its fully depressed position corresponding to the complete disengagement of the rack bar 71 from the pinion 74, and with the rack 235 and the pawl 236 in coöperative relation, then a latch 241 brings its notch 242 into engagement with the corner 240, locking the parallel linkage from return motion until the latch 241 is released. The latch 241 is secured to a shaft 243, on which is secured an arm 244 pressed by a spring 245, so as to normally tend to bring the latch 241 into its effective position. When, however, the driving rack bar 71 comes to its home position, the arm 69 engages an adjustable stop screw 246 on the arm 244, and rocks the arm, together with the latch 241, against the tension of the spring 245, to the ineffective position of the latch 241. It will thus be seen that as the driving rack bar 71 completes its return movement, the latch 241 is released and thus permits a return movement of the parallel linkage together with the rack bar 71 so that the latter will be in a position to mesh once more with the gear 74. The upward movement of the parallel linkage, and thus of the driving rack bar 71, is limited accurately by an adjustable set screw 247, which engages a projection or toe 258 provided on the link 105.

It will be noted that during the time the driving rack 71 is held in its depressed position, all connected parts, including the universal frame 36, will be held in their actuated position until the numeral key has nearly reached its normal position, thus holding in abeyance the action of the typewriter carriage escapement mechanism until all other parts have reached a normal position, when the typewriter carriage 30, totalizer carriage 135 and totalizer 54 will be permitted to move one letter-space in letter-feeding direction.

The rack bar 71 is to drive a master wheel 72 through a change-gear train which includes a pinion 74 meshing with rack teeth 75 provided on the rack bar 71. The pinion 74 (Fig. 4) is a barrel gear having teeth of considerable width, so as to slide transversely of the rack bar 71, and yet be capable of meshing therewith in all positions. The gear 74 is secured to a shaft 76, to which is also secured a gear 77, which may mesh alternatively with a gear 78 or with a gear 79 secured to the master-wheel shaft 80. If the gear 77 meshes directly with the gear 79, it will drive the master wheel in one direction. If however, it meshes with the gear 78, it will drive the master wheel in the opposite direction through an intermediate gear 81 secured for rotation with the gear 78 and meshing with the gear 79 on the master-wheel shaft 80.

The mechanism for determining the direction of rotation of the master wheel, known usually in this art as state-controlling mechanism, differs in this case from that disclosed in the co-pending application of Pitman above referred to. Instead of having a state-control mechanism capable of occupying a neutral position, as in said pending application, in this case said state-controlling mechanism may occupy only two extreme positions, that of addition and that of subtraction. Otherwise the connections for determining the direction of rotation of the master wheel are similar to those in said co-pending application and are as follows: The barrel gear 74 and the large gear 77 are moved together as a unit, the barrel gear 74 maintaining its teeth in mesh with the rack 75, while the gear 77 shifts from engagement with the gear 78 to engagement with the gear 79. To obtain this shifting in the gears 74 and 77, to change the direction of drive, or to control the drive of the master wheel, the shaft 76 on which they are secured, is mounted for sliding movement in the direction of its length (Fig. 4).

To shift the shaft 76, and with it the gears 74 and 77, a collar 82 is provided on the shaft to be engaged by a lever 83, which in turn is rocked by an arm 84 secured to a shaft 85 of the bichrome shift mechanism common to Underwood typewriters. If adding is desired, with printing in black, a double key lever 86, 87 fast on the shaft 85 is operated to bring it into the position shown in Fig. 11, when the gears 74 and 77 are shifted to the extreme right of their position with the gear 77 in mesh with the gear 79. If it is desired to subtract, with the printing in red, the double key lever 86, 87 is manipulated to its Fig. 4 position, when the gears 74, 77 will be shifted to the extreme left, bringing the gear 77 into mesh with the gear 78, so that the latter will drive indirectly through the gear 81, the gear 79 and thus the master wheel, in the opposite direction.

The master wheel 72 is to drive the computing wheels of the totalizer 54, *seriatim*. The computing wheels of the totalizer are arranged in pairs in the same plane (Fig. 1), including secondary computing wheels 107 arranged to mesh directly with the master wheel, and primary computing wheels 108 having numbers on their peripheries (Fig. 16), so as to be in the form of dial wheels meshing with the computing wheels 107. The computing wheels may comprise any number of teeth that will permit the dial wheel to rotate one digit's distance for every digit's distance of rotation of the master wheel, and will still leave the secondary computing wheel 107 in meshing juxtaposition with the master wheel at any stopping point of the master wheel or computing wheel at the end of any computation. In the present embodiment, however, the dial wheels 108 (Figs. 16, 17 and 18) are shown as bearing ten equally-spaced digits, from "0" to "9" and meshing with the secondary computing wheels 107 of equal diameter. The secondary computing wheel in the present embodiment of this invention, is so constructed that it would bear twenty gear teeth of standard pitch, but is mutilated by the removal of every other tooth, leaving ten teeth with a space between the teeth equal to twice the standard distance between the teeth for said pitch. In order that the dial wheels 108 may be used as gear wheels to mesh with the computing wheels 107, and allow numerals to be placed on their peripheries of sufficient size to be easily legible, said dial wheels are constructed as follows: At the center of each dial wheel is a hub, through which passes a dial wheel shaft 112 extending across the totalizer 54 and rigidly mounted on its sides 121. Integral with the hub is an annular web, on the periphery of which are mounted ten flat blocks 110, on the faces of which are placed the numerals, so that one numeral at a time of each dial wheel will be visible at a sight-opening 109 formed in the totalizer casing and extending across all the dial wheels. The blocks 110 are of a smaller dimension, lengthwise of the axis of the dial wheels, than the hubs of said wheels, in order to avoid frictional contact between the dial wheels at their peripheries when they are placed adjacent to each other and rotated on the dial wheel shaft 112. The space 111 between adjacent blocks 110 of each dial wheel are formed so as to equal the space between two standard gear teeth of a pitch and shape equal to the teeth of the secondary computing wheel 107, and are adapted to mesh therewith. It will be seen that the gear action between the secondary computing wheel 107 and the dial wheel 108 is the same as if the dial wheel were a gear wheel of the same construction as the computing wheel 107, but instead of every other tooth being removed, as on the wheel 107, every other tooth space is omitted on the dial wheel, the material of the dial wheel filling said spaces, thus extending the area of each block 110 to permit a large numeral to be placed on the face thereof. This construction of the dial wheels also has the advantage of causing said dial wheels to be unusually light, which reduces their momentum during rotation and resultant liability to overthrow, and wear of the parts.

It is advantageous to hold the dial and computing wheels against accidental rotation when the totalizer 54 is not in a computing zone, or when the totalizer is removed from the machine, so that the computing wheels 107 will always be held in such position as to properly mesh with the master wheel 72 when the totalizer is placed upon its carriage and brought into a computing zone. For this purpose there is provided a universal locking bar 113, extending across the front of all the computing wheels 107 and the entire length of the totalizer, (Figs. 1, 3 and 5) said bar having a groove 114 extending along its entire length, adapted to engage a tooth of each of the secondary computing wheels 107, to hold said computing wheels against rotation. The universal bar 113 is provided with cam surfaces 115 extending the entire length of, and adjacent to, either side of the groove 114, so that the teeth of the computing wheel 107 by riding up on said cam surfaces, may force the universal bar 113 forward in order to come into alinement with the groove 114, in case the universal bar should be released to become effective, as will presently be described.

The universal locking bar 113 is fastened to the lower end of one or more arms 116 loosely mounted on the dial wheel shaft 112, and having portions 117 concentric with said shaft, the periphery of the portions 117 being at the same distance from the shaft 112, at the sight hole 109, as the peripheries of the dial wheels 108. The width of the portions 117 may be made to occupy one or more letter-space distances between adjacent dial wheels, and the arms 116 may be so placed along the shaft 112 adjacent to the dial wheels, so as to form comma spaces, decimal point spaces, or any other spacing that may be desirable, the concentric portion 117 being so placed as to appear at the sight opening 109 (Fig. 4) to form a continuous surface, the portions 117 having the appearance of blank dial wheels or partitions of the totalizer. The arm 116 is provided with an extension 118, fast to the end of which is a spring 119, the other end of which is fast on a rod 120 extending between the sides 121 of the totalizer 54, said spring tending to force the universal locking bar into effective position.

When the typewriter carriage and totalizer have reached a computing zone, it is necessary to release the computing wheels so that they may be rotated by the master wheel. For this purpose there is provided on the framework 122 of the computing mechanism, a double cam 123, the right end of which (Fig. 6) is adapted to engage a cam surface 124 on the universal bar 113 when the computing wheel of highest denomination approaches the master wheel, and to force said universal bar 113 out of engagement with the computing wheels 107, against the tension of the spring 119, so as to completely release said computing wheels when the computing wheel of highest denomination has come into full mesh with the master wheel, ready for a computation to take place. The universal locking bar 113 has a surface 125 extending nearly the entire length thereof, adapted to engage the outer face of the double cam 123, and to hold said bar 113 in ineffective position throughout the entire letter-feed travel of the totalizer 54, from the time that the computing wheel of highest denomination has passed into mesh with the master wheel, to the time that the units computing wheel has moved out of mesh with the master wheel, at which time a cam surface 126 (Fig. 5) on the bar 113 will come into engagement with the left end (Fig. 6) of the double cam 123, which will allow the spring 119 to move the locking bar 113 back into effective position, thus locking the computing wheels against accidental rotation after they have come out of mesh with the master wheel.

When the totalizer 54 is in a computing zone, and when the locking bar 113 is ineffective, in order that the computing wheels may be held against accidental rotation, and may be brought into proper meshing position with the master wheel, there is provided at the right of, and adjacent to, the master wheel, a justifying bar 127, the effective portion of which extends rightward of the master wheel a distance sufficient to reach the units computing wheel 107 when the computing wheel of highest denomination is in mesh with the master wheel. The justifying bar has a cam surface 128 formed at its right end, adapted to engage a tooth of any computing wheel 107 which may have been accidentally displaced, to bring said tooth into proper alinement, so as to avoid collision with the teeth of the master wheel and consequent stalling of the machine or wreckage, said justifying bar being so formed as to completely fill the space between two adjacent teeth of each computing wheel, and so placed on the framework 122 as to hold the computing wheels in proper meshing relation with the master wheel and a tens-carrying mechanism 129, which is placed adjacent to and at the left of the master wheel, and serves to hold in proper alinement the computing wheels which have passed to the left of the master wheel during the time that any of the computing wheels 107 remain in mesh with the tens-carrying mechanism 129, as in co-pending application Serial No. 24,390. As the units computing wheel 107 passes out of mesh with the master wheel 72, when the carriage is traveling in letter-feeding direction, the wheel of highest denomination will move out of mesh with the extreme left-hand carry-over wheel of the carrying mechanism 129, and will not be held by the universal locking bar 113, since said locking bar is held in ineffective position by the double cam 123, until the units computing wheel has passed entirely out of mesh with the master wheel 72. It is therefore necessary to hold the computing wheels 107 of higher order against accidental rotation, until the universal locking bar has had sufficient time to move into effective position. For this purpose there is provided a justifying bar 130, adjacent to and at the left of the tens-carrying mechanism 129, said bar being of similar structure and similarly mounted as the bar 127, and in line therewith. The justifying bar 130 is also provided with a cam surface at its left end similar to the cam surface 128, for the purpose of camming into alinement any computing wheels 107 which may have been accidentally displaced when the totalizer 54 is at the left of the computing mechanism, said justification taking place when the totalizer is moved rightward over the bar 130. The function of the justifying-bars 127 and 130 is not only to bring and hold the computing wheels in alinement with the master wheel, but also serve to bring the teeth of the computing wheels 107 into engaging relation with the groove 114 of the universal locking bar 113 before said computing wheels have arrived at the master wheel, thus enabling the universal locking bar 113 to engage and hold all of the computing wheels 107 in proper position and alinement before the totalizer 54 reaches a computing zone.

It will be seen from the foregoing that when the totalizer 54 is in a computing zone, all the other computing wheels 107, 108 are locked during the rotation of the master wheel, except those on which computation is being performed, and that all the computing wheels are held against rotation when the master wheel is silent or when the totalizer is out of a computing zone or removed from the machine.

To enable the typist to position the totalizer 54 along the length of the totalizer carriage, in order to place the totalizer so as to perform computation at any writing point along the writing line of the platen, or to entirely remove the totalizer from the machine and easily replace the same, there is provided at the rear of the framework of the totalizer 54, a vertical slide-way 131 (Figs. 2 and 3), in which there is mounted a slide 132, having upper and lower teeth 133 formed thereon, adapted to engage two rows of notches 134 (Fig. 4) formed on a totalizer carriage 135 and placed on the totalizer carriage at letter-space intervals. The upper and lower teeth 133 of the slide 132 normally rest in their respective upper and lower rows of notches 134, to hold the totalizer against lateral displacement and in any letter-space position along the writing line.

In order to hold the totalizer against forward and rearward displacement, there is provided on the totalizer a rod 136 (Figs. 2 and 3), pivoted on and extending between the side plates 121 of the totalizer. Midway between the ends of said rod is fast a rearwardly extending latch 137, having a forwardly extending finger-piece 138 formed thereon, and having a spring 139, one end of which is fast to the latch, and the other end of which is fast in the totalizer framework, said spring being adapted to depress the rearward end of the latch 137, so that its fingers may normally pass behind the upper edge 140 of the totalizer carriage 135, thus holding the upper end of the totalizer against forward displacement, the lower end of said totalizer being held against forward displacement by a tongue 141 normally passing behind a lower edge 142 of the totalizer carriage 135. To hold said totalizer against rearward displacement, the side plates 121 have upper and lower extensions 143 formed thereon, which engage the front face of the totalizer carriage 135.

To position the totalizer 54 along said carriage 135, the finger-piece 138 is depressed, to raise the rear end of the latch 137 against the tension of its spring 139. The rear end of said latch is bifurcated, and straddles a rearwardly extending arm 144, pivoted on the rock shaft 136 and within the hub of the latch 137, and is forced downwardly by a spring 148. At the rear end of the arm 144, is rigidly mounted a pin 145, the ends of which overlie the rear ends of the forks of the latch 137. Pivotally mounted at 145 on the arm 144, is a downwardly extending link 146, the lower end of which is pivoted at 147 to the slide 132. It will be seen that on the depression of the finger-piece 138, the rear forks of the latch 137 will engage the ends of the pin 145, to swing the arm 144 upwardly against the tension of its spring 148, and carry therewith the slide 132 upwardly, to move its teeth 133 out of the notches 134 on the totalizer carriage 135, at which time the totalizer will be free to slide along the length of its carriage 135, as long as a downward pressure on the finger-piece 138, and a rearward pressure on the totalizer carriage are maintained. When the totalizer has been brought to any desired letter-space position along its carriage, pressure on the finger-piece may be released, when the parts 137, 144 and 132 will be restored to their normal position, through the agency of their respective springs 139 and 148, the lower ends of the teeth 133 being V-shaped, so as to easily enter the notches 134 of the totalizer carriage 135, the downward motion of said teeth being limited by the lower edge of the arm 144 striking the upper edge 140 of the totalizer carriage 135, as seen in Figs. 1 and 3.

If it is desired to remove the totalizer from the machine, downward pressure is applied to the finger-piece 138, to unlock the totalizer from its carriage 135, as hereinbefore described, but instead of a rearward pressure on the totalizer toward its carriage, a downward pressure is exerted on the totalizer, in order to move the tongue 141 on the totalizer framework out of engagement with the lower edge 142 of the totalizer carriage, at which time said totalizer may be easily removed from the machine.

To replace the totalizer on the machine, its tongue 141 is first passed behind the lower edge 142 of the totalizer carriage. The upper end of the totalizer is then pushed rearwardly, at which time the rear end of the latch 137 and the rear end of the arm 144 will be forced into engagement with a cam surface 149, formed at the upper edge and front face of the totalizer carriage 135, said cam serving to move the rear ends of the latch and arm 144 upwardly, until the totalizer has reached the limit of its rearward motion, when the hooks at the rear end of the latch 137 will snap over the upper edge 140 of the totalizer carriage, and the teeth 133 will snap down into their respective notches to lock the totalizer against motion in any direction relative to its carriage.

In order to avoid any possibility of a relative movement between the computing wheels and the master-wheel when the latter is rotated, the totalizer is locked against movement. For this purpose, the totalizer is provided with engaging teeth, forming a rack 250 (Fig. 1).

On the frame which supports the actuating mechanism for the totalizer, there is provided a bell-crank 248 (Fig. 20) having a dog 249 arranged to engage between the teeth of the rack 250. The bell-crank 248 is also provided with a locking tooth 251, which normally engages between the teeth of the master-wheel 72 to prevent rotation thereof. When, however, a numeral key is actuated and the driving action of the master wheel is to be started, the bell-crank 248 will be rocked to remove the locking tooth 251 from engagement wih he maser wheel 72, and to bring the dog 249 into engagement with the rack 250, thus having a concomitant unlocking of the master wheel and a locking against traveling movement of the totalizer.

To rock the bell-crank 248 at this time, there is provided in the rack bar 71, which forms one of the main driving members, a cam depression or socket 252, in which normally rests the hook end of an arm 253 secured to a shaft 254. When the rack bar 71 starts forward in its driving movement, the cam surface of the socket 252 will force the arm 253 out on to the dwell portion 255 of the rack bar 71, thereby rocking the shaft 254. The shaft 254 has secured therewith for swinging movement, an arm 256 (Fig. 20), which hooks upwardly to engage one arm 257 of the bell-crank lever 248. It will thus be seen that while the rack bar 71 is traveling forward with its rack 75 in driving engagement with the barrel gear 74, the totalizer carriage will be locked against traveling movement, and the master wheel 72 will be unlocked to permit a rotation of the same.

The totalizer carriage 135 is free to move lengthwise of the machine in either direction, but is rigidly held against motion in any other direction. For this purpose there is provided on either side of the machine, brackets 150, to which is rigidly fixed a horizontal bar 151, extending across the front of the machine, and in which are formed upper and lower grooves or tracks 152, 153, respectively, and on its front face a groove or track 154, all of said grooves extending the entire length of the bar 151, and in which run two sets of rollers 155, one set of which is mounted on either side and at the rear of the totalizer carriage 135. The two sets of rollers 155 are so placed, relative to the length of the totalizer carriage 135 and bar 151, that the rollers 155 will remain within the tracks formed in the bar 151, when the carriage is at either extreme of its rightward or leftward travel. It will be seen, in Fig. 1, that the horizontally placed rolls 155 which run in the tracks 152, 153, will hold the totalizer carriage 135 against forward or rearward displacement, and that the vertically placed rolls 155 running in the front track 154 will hold said carriage against vertical displacement, thus forming a rigid support for the totalizer 54, allowing motion in letter-feeding direction only.

The machine is provided with the usual Underwood line-space scale 156, fast to the framework thereof, and is also provided with an index 157, fast to the front of the framework of the typewriter carriage, the object being to indicate at what point along the writing line on the work-sheet on the platen 28, printing will take place at the depression of a key.

It is advantageous to adjustably mount the totalizer carriage on the typewriter carriage, so that the computing wheels of the totalizer will come into proper registration with the computing mechanism, when placed at any point along the length of the totalizer carriage. For this purpose there is provided at the right of the typewriter carriage 30, a forwardly extending arm 158, pivoted at 159 to the framework of the typewriter carriage, and having a downwardly extending tongue 160 at its forward end (Figs. 4, 6 and 7), which fits loosely into a groove 161 formed at the right end of the totalizer carriage 135 crosswise of its length. The arm 158 has an extension 162, which has a slot 163 formed therein, through which loosely passes a screw 164, which is threaded into the framework of the typewriter carriage 30. The typewriter carriage adjacent the extension 162 of the arm 158 has ears 165 formed thereon, through which pass oppositely disposed screws 166, the ends of which engage either side of the extension 162. When it is desired to laterally adjust the totalizer carriage 135, the screws 164, 166, are loosened, so as to permit the arm 158 to freely swing on its pivot 159. The screws 166 are then turned to swing the extension 162 forwardly or rearwardly about the pivot 159, which causes a sidewise motion of the tongue 160 and the totalizer carriage 135. The screws 166 are operated until the graduations on a scale 67 (Figs. 1 and 9) fast to the front of the framework of the totalizer 54, come into exact registration with an index 168 fast on the framework 122 of the computing mechanism, said index 168 and scale 167 being so placed, relative to their respective master wheel 72 and computing wheels 107, that when said scale and index are in register with each other, the computing wheels 107 will be in exact lateral register with the master wheel 72, thus avoiding any relative overlapping of the master wheel and computing wheels, so that the master wheel will rotate computing wheels of a single denomination at a time. After the totalizer and its carriage have been brought into proper register with the computing mechanism, the screws 164, 166, and lock nuts on the screws 166 are tightened to hold the arm 158 against displacement.

In order to avoid vibration of the totalizer carriage 135, due to the looseness of the tongue 160 in its slot 161, there is provided at the left side of the framework of the typewriter carriage 30, a forwardly extending arm 175, in the forward end of which is threaded a screw 169, the end of which is adapted to bear against the left end of the totalizer carriage 135, and to force said carriage rightwardly, so as to force the left side of the groove 161 against the tongue 160, thus avoiding any lateral play of the totalizer carriage 135 relative to the typewriter carriage 30, the screw 169 being provided with a lock nut, to avoid displacement due to accident or vibration.

Since the notches 134 of the totalizer carriage are arranged at letter-space intervals along its length, similar to the letter-space intervals along the scale 156 on the framework of the typewriter, the totalizer 54 will be in proper lateral register with the computing mechanism, when placed in any position along the length of the totalizer carriage 135. It will be particularly noted that in the construction above described, the arms 158 and 175 loosely embrace the totalizer carriage 135, and that the bar 151 is fixed relatively to the master wheel shaft. Therefore, when the grooves 152 and 153 are made exactly parallel to the master wheel shaft, the totalizer will always travel accurately past said wheel. In case the typewriter carriage does not travel exactly parallel with the grooves 152 and 153, the arms 158 and 175 will permit a slight movement between them and the totalizer carriage 135.

In the description of the mechanism for controlling whether addition or subtraction was to be performed by the computing device, it will be remembered that the keys 86 and 87 are capable of occupying either one extreme position or the other, but are not adapted to occupy an intermediate position, such as that permitted in the construction referred to in the co-pending application.

With this construction and with the provision of an independent disconnecting or silencing means for the computing mechanism, it is possible to use the numeral keys for printing numbers in the computing zone in either color while the computing mechanism is in disconnected or silenced condition. The particular means for independently silencing the computing mechanism will now be described.

For this purpose, there is mounted on the framework at the right side of the typewriter a hand lever 170, the handle 171 of which protrudes over the framework of the typewriter, and may be shifted into alinement with the words "On" and "Off", marked on the framework of the machine. Said lever is held in "on" or "off" position by a spring and ball detent 172, placed in its hub, coöperating with two ball sockets 173, so placed in a disk 174 (Fig. 4), as to hold the lever 170 in the "on" or "off" position. The disk 174 is also provided with two stop surfaces 177, against either of which may strike a pin 178, to limit the motion of the lever 170 in "on" or "off" direction. The manual control lever 170 has a depending arm 180, which has a pin-and-slot connection at 181, with a rearwardly extending link 182, which is pivotally connected to the lower end of the bell-crank 62. When the handle 171 is moved from the "on" to the "off" position, the link 182 will be thrust rearwardly to rock the bell-crank 62 in counter-clockwise direction, looking from the right, to cause the finger 63 mounted on the forward end thereof to depress the connector 57, so that its slot 56 will become disengaged from the pin 55 on the arm 52 of the oscillator 51, thus enabling the oscillator to be rocked forwardly without transmitting its motion to the connector 57 and connected parts. It will be seen that when the lever 170 is in the "off" position, the depression of any numeral key will rock the oscillator idly, enabling the typist to print numerals on the work-sheet at any point along the writing line without effecting a corresponding computation.

The pin-and-slot connection 181, between the control lever 170 and the rearwardly extending link 182, is provided to enable the computing mechanism to become disconnected from the numeral keys without effecting the setting of the lever 170 when said disconnection is effected by shifting the platen to upper-case position, as hereinbefore described. It will be seen by reference to Figs. 1 and 13, that on the depression of a shift key 43, the rearward extension of the shift key lever 44 will be swung forwardly, and carry forwardly therewith the lower part of the shift frame 45, which will cause the link 61 to be thrust forwardly to swing the bell crank 62 in counter-clockwise direction, when its depending arm will swing rearwardly and carry therewith the link 182, causing its slot at 181 to slide over the pin fast to the lower end of the depending arm 180 of the lever 170, when said lever is in the "on" position, permitting said lever to remain in "on" position, even though the computing mechanism is disconnected from the typewriter.

When the machine is in upper-case position and the computing mechanism disconnected, the control lever 170 may be moved to the "off" position, which will cause the pin on its arm 180 to move idly to the rear end of the slot in the pin-and-slot connection 181 to hold the computing mechanism in its disconnected state, even though the shift key should be restored to its normal position, which would restore the connection of the computing mechanism to the typewriter mechanism if the handle 171 of the manual control lever were left in its "on" position.

In order that the computing mechanism may be connected or disconnected by the actuation of the manual control lever 170 without affecting the case-shift mechanism to which the disconnecting mechanism is attached, there is provided between shift frame 45 and link 61, a pin-and-slot connection 183, which will permit an idle forward motion of the link 61 when the bell-crank 62 is swung in a counter-clockwise direction by the operation of the manual disconnecting handle 171, the pin fast on the framework 45 being at the forward end of the slot of the pin-and-slot connection 183 when the shift frame is in lower-case position, and the bell-crank lever 62 in normal position, the counter-clockwise motion of which, caused by the lever 170, will draw the link 61 forwardly, so that the slot at its rear end will pass idly over the pin on the shift frame 45, leaving the shift frame in its normal lower-case position. At this time the shift frame 45 may be swung to an upper-case position without effecting a change in the setting effected by the manual control lever 170.

The actuation of the manual control lever 170 to its "off" position avoids the necessity of removing the totalizer from its carriage when it is desired to print numerals in a computing zone without registering in the totalizer. Wear of the parts of the computing mechanism may be minimized by setting the lever 170 in "off" position when computation is not desired either in or out of a computing zone, since the oscillator 51 will be actuated by the numeral keys while the other parts of the computing mechanism remain silent.

It will be particularly noted that the above described independent connection or silencing means operated by the lever 170 permits the silencing of the computing mechanism independently of the bichrome mechanism. The fact that the state-controlling mechanism and the bichrome mechanism are connected insures that the printing in any particular color will be in accordance with the kind of computation being performed, while the independent silencing means renders it possible to print in either color, in the computing zone, with the numeral keys, while the computing mechanism is in silenced condition.

It is advantageous to lock the alphabet keys and space key against actuation on the depression of a numeral key, as well as to lock the rest of the numeral keys against actuation during the actuation of one numeral key. For this purpose, each differentiator 48 is provided with an extension 184 (Figs. 1, 9, 10 and 13), on which are formed cam surfaces 185 and 186, the former of which normally engages the universal alphabet key locking bail 187 which is normally out of engagement with hooks 188 formed on the key levers 23 of the alphabet keys 22. The universal bar 187 is horizontally disposed, and extends across and above all of the key levers 23 of the entire keyboard of the typewriter, and is supported at both ends by upright arms 189 which are pivoted at 190 to the framework of the machine. At the depression of a numeral key 21, the extension 184 fast to its key lever, is swung downwardly to cause its cam 185 to engage and swing forwardly the universal locking bar 187, to force said bar forwardly against the tension of its spring 191 under the hooks 188 during the early part of the down stroke of the numeral key, thus locking the alphabet keys 22 against depression, said lock being maintained until the latter part of the return stroke of the numeral key 21, the cam surface 186 of the extension 184 being adapted to hold the universal locking bar 187 in effective position during the greater part of the down stroke and up stroke of the numeral key, as seen in Fig. 9.

In order to lock the space key against actuation at the depression of any numeral key, each of the arms 189 is provided with a downwardly extending hook 192, which normally lies out of the path of projections 193 formed on either side of the space key frame 194, and adapted to be engaged by the hooks 192 when the hooks are swung rearwardly at the time that the universal locking bail 187 is swung to effective position by the numeral keys 21 (Fig. 9). It will be seen that during the actuation of a numeral key, the space key 194 will be held against actuation, to prevent any motion of the typewriter and totalizer carriages in letter-feed direction, thus maintaining the lateral registration of the computing wheels 107 and master wheel 72 during a computation, and avoiding any mal-action of the computing mechanism.

It is advantageous to lock the other numeral keys against actuation during the actuation of any one numeral key, in order to prevent too rapid consecutive actuation of the numeral keys, either of the same one or of different ones.

To prevent any numeral key 21 from being depressed during the up stroke of any other numeral key, there is provided on each numeral key lever 23 a pendent 197 pivoted to the numeral keys at 198, and guided at their lower ends in slots 199$^a$ formed in a common bar 199 fast to the framework of the machine. The pendent links 197 are provided at their forward edge with downwardly facing teeth 201, adapted to be engaged by the associated one of a series of spring pressed pawls 202 pivotally mounted on a common shaft 203, said pawls normally being free and clear of the links 197, so that any numeral key may be freely depressed.

To move the pawls into effective position at the end of the down stroke of any numeral key, there is fast to the shaft 203 at its right end, a forwardly extending arm 204, to the forward end of which is pivotally connected an upwardly extending link 205, the upper end of which is pivoted at the end of a rearwardly extending arm 206 fast on the rock shaft 98, which swings in counter-clockwise direction (Figs. 9 and 10) at the rearward actuation of the universal frame 36, which takes place at the end of the down stroke of any numeral key, as hereinbefore described.

It will be seen that when the driving rack 71 is depressed, at the end of a computation, out of mesh with the drive gearing of the master wheel, which takes place at the end of the down stroke of a numeral key (Fig. 9), the arm 206 will be swung upwardly, and carry therewith the link 205 and arm 204 upwardly to rock the universal pawl shaft 203 in clockwise direction to bring the free ends of the pawls 202 into engagement with the teeth 201 of the pendents 197, said pawls 202 being held in engagement with the teeth 201 until the driving rack 71 has been returned to its rearward normal position, at which time the numeral key will have reached the end of its up stroke, during which time the depression of any numeral key will cause the teeth of its pendent 197 to abut against the free end of the associated pawl 202 to prevent the depression of said numeral key. The return motion of the depressed numeral key, however, is possible, since any pawl 202 may be independently moved forwardly against the action of its spring 207, causing the teeth 201 of the pendent 197 to snap past the free end of the pawl 202, so that the numeral key which has been depressed in a computation may return freely to its normal position.

To prevent the actuation of any other numeral key before the actuation of one numeral key is completed, and to prevent the simultaneous depression of more than one numeral key, each pendent 197 is provided with a rear extension 208 normally out of engagement with a series of pendent hinges 209, two for each numeral key, and hinged at 210 to a common bar 211 extending across and fast to the framework of the machine directly under the numeral keys, said hinges being so constructed and mounted as to permit a predetermined amount of play therebetween when the extensions 208 of the pendents 197 are out of engagement with said hinges 209. At the depression of a numeral key, the extension 208 will pass into engagement with and between the hinges 209 of its associated pair, to take up the space provided by said predetermined amount of play between the hinges, so as to cause all the hinges along the bar 211 to contact, with each other, the depressed extension 208 and pins 212, fast on the bar 211 placed on either side of the series of hinges 209 to limit said predetermined amount of play. It will be seen that during the actuation of any numeral key, no other numeral key can be depressed, since the play between the hinges 209 being taken up by the depressed extension 208, the extension 208 of any other numeral key will strike between its associated hinges 209 upon depression of the other numeral key, but will be unable to pass therebetween.

It will be seen that through the combined agency of the pawl and ratchet mechanism 202, 201, and the alphabet and space key locking mechanism 184, 187, 188, no other key may be depressed during the actuation of any numeral key, until a computation initiated by said numeral key, has been entirely completed, and all associated parts returned to their normal position, when typewriting or computing may be resumed.

It is desirable to prevent the actuation of numeral keys during jump or tabulating movements of the typewriter and totalizer carriages 30 and 135, so that the totalizer will be at rest and in proper meshing relation with the computing mechanism before any computation may take place. For this purpose there is provided a bail 213 universal to all the decimal tabulator key levers 39, and which consists of a rock shaft 214 pivoted at 215 to the framework of the machine (Figs. 1, 4 and 8), having fast thereon at either end a downwardly and rearwardly extending arm 216 between the ends of which is rigidly supported the universal bar 217 extending across the machine directly under all the decimal tabulator key levers 39, and adapted to be depressed on the down stroke of any decimal tabulator key 38, swinging therewith the frame or bail 213 about its pivot 215. On the depression of a decimal tabulator key 38, the universal bail 213 carries downward therewith an upwardly extending arm 218 loosely mounted on the universal bar 217, the upper end of said arm being pivoted about midway between the ends of a finger 219, the forward end of which is fast on a rock shaft 220 journaled in brackets 221 fast to the framework of the machine, said rock shaft having wound around it a spring 222, one end of which is fast to the rock shaft, and the other end of which is fast to one of the brackets 221, and tends to force the finger 219 upwardly into ineffective position and to hold the universal bar 217 against the lower edges of the decimal tabulator key levers 39.

It will be seen that, on the depression of a decimal tabulator key 38, through the agency of the bail 213 and arm 218, the rear free end 223 of the finger 219 will be swung downwardly about its pivot 220, said free end being guided in a vertical slot 224 formed in the bar 211, and is adapted to pass between two adjacent hinges 209, to take up the lost motion between said hinges and their motion limiting pins 212, thus holding said hinges against actuation during the time that the decimal tabulator key 38 is held in a depressed position, and preventing the entrance of any rear extension 208 of any link 197 between any pair of adjacent hinges 209, thus preventing the depression of any numeral key, and corresponding computation (Fig. 4). The finger 219 may be placed so as to pass between any two adjacent hinges 209 or pin 212, except in the same plane as a pendent link 197, but is advantageously placed about the middle of the bail 213, in order to secure a better balanced action of the parts.

The computing mechanism may be set to either subtraction or addition, by shifting the gear 77 into mesh with the gears 78 or 79, respectively, by the depression of the respective subtraction and addition keys 87 and 86. It will be noted, by reference to Fig. 4, that the gear 77 must traverse an idle space in its rightward motion in moving out of mesh with the gear 78 into mesh with the gear 79, there being a time intermediate said two positions at which the gear 77 is in mesh with neither of the gears 78 or 79, at which point it may remain in case the typist has not fully depressed the keys 86 or 87 of the state control lever. If a numeral key could be depressed at the time that the gear 77 stands in said ineffective position when the typewriter carriage 30 is in a computing zone, the numeral would be printed on the work-sheet, but no computation could take place. It is therefore advantageous to lock the numeral keys against actuation in case the typist fails to fully depress the keys 86 or 87 of the state control lever. For this purpose there is fast on the rock shaft 85 (Figs. 1, 4, 11 and 12) a rightwardly extending arm 227, at the end of which is pivoted a downwardly extending link 228, the lower end of which is guided in a slot formed in the common bar 199, and has a rear extension 229 near its lower end, adapted to pass between two adjacent hinges 209 to take up the lost motion between said series of hinges during its passage between said adjacent hinges. When the subtraction key 87 is fully depressed, the arm 227 and link 228 will be in their upper (Fig. 4) position with the extension 229 above the lower extremities of its associated adjacent hinges 209. When the adding key 86 is fully depressed, the arm 227 and link 228 will be moved to their lowermost position (Fig. 11) at which time the extension 229 will have passed between the lower extremities of the hinges 209 and out of engagement therewith, and will occupy an ineffective position below said extremities of the hinges 209. If, however, either of the keys 86 or 87 is not moved to the extreme end of its motion, the extension 229 will remain between the ends of its associated adjacent hinges 209 to take up the lost motion therebetween, so that the rear extension 208 of the pendent 197 of any numeral key 21 will be prevented from passing between its associated adjacent hinges 209, thus preventing the depression of any numeral key during the time that the gear 77 is not in full mesh, or out of mesh, with the gears 78 or 79, at which time computation or printing cannot take place.

It will be seen from the foregoing that computation cannot take place without printing, or vice versa, when the typewriter carriage and totalizer is in a computing zone, except when the platen is in upper case position, or the computing mechanism has been disconnected from the typewriter by the manual operation of the handle 171 to the "off" position.

It will also be seen that the decimal tabulator keys 38 cannot be depressed unless the keys 86, 87 of the state control lever have been depressed to the limit of their motion toward their respective positions.

It will also be seen that the numeral keys will be locked against depression when the usual Underwood bichrome mechanism, which controls the color in which printing is to be done, is left in a midway position owing to the state control keys 86 or 87 not having been fully depressed, in which position the ribbon of the typewriter will remain silent during the actuation of a key. Since the state control keys 86 or 87 must be fully depressed before computation may take place, said depression insures that the type 26 will print on the work-sheet in a color corresponding to the type of computation being performed.

Variations may be resorted to within the scope of the invention, and portions of the improvements may be used without others.

Having thus described my invention, I claim:

1. An indexing mechanism for computing machines having numeral keys and an oscillator moved different distances under the control of the keys; and comprising, in combination, a cam on each numeral key for positively moving said part distances corresponding to the respective digits on the keys, and a spring for returning said part to normal position, said cam being so shaped as to permit the release of said part from the action of the cam at an early stage in the return movement of the key so that the key and oscillator may return to normal position independently of each other.

2. In a computing machine, the combination with numeral keys, computing mechanism, connecting mechanism for operating said computing mechanism different distances under the control of said keys, a rocking frame forming part of the connections between the numeral keys and the computing mechanism, a connector pivoted on said frame, and a driving connection between said keys and said frame through said connector acting in a direct line with said pivotal connection between said connector and said rocking frame.

3. In a computing machine, the combination with numeral keys, computing mechanism, connecting mechanism under the control of the keys for acting on said computing mechanism, an oscillator forming part of said connecting mechanism and actuated variable amounts, according to the digital values of said keys, and connections between said oscillator and the computing mechanism, comprising a rocking member and a connector pivoted thereto, said connector being engageable with and disengageable from said oscillator, the angle formed at the point of drive between the oscillator and said connector and the pivot point of the oscillator being a right angle, so that there is no tendency to disengage said connector from the oscillator during driving action.

4. In a computing machine, the combination with numeral keys, computing mechanism, connecting mechanism under the control of the keys for acting on said computing mechanism, an oscillator forming part of said connecting mechanism and actuated variable amounts, according to the digital values of said keys, connections between said oscillator and the computing mechanism, comprising a rocking member and a connector pivoted thereto, said connector being engageable with and disengageable from said oscillator, and a spring for holding said connector in position to be driven by said oscillator, said spring being attached to said connector and to said rocking frame, whereby the tension of said spring will not be varied during the driving action of said oscillator.

5. In a computing machine, the combination with numeral keys, computing mechanism, connecting mechanism under the control of the keys for acting on said computing mechanism, an oscillator forming part of said connecting mechanism and actuated variable amounts, according to the digital values of said keys, connections between said oscillator and the computing mechanism, comprising a rocking member and a connector pivoted thereto, said connector being engageable with and disengageable from said oscillator, and a spring for holding said connector in position to be driven by said oscillator, the angle formed at the point of drive between the oscillator and said connector being a right angle, so that there is no tendency to disengage said connector from the oscillator during driving action, thereby lessening the power required of said spring to hold said connector to its working position.

6. In a computing machine, the combination with numeral keys, computing mechanism, connecting mechanism under the control of the keys for acting on said computing mechanism, an oscillator forming part of said connecting mechanism and actuated variable amounts, according to the digital values of said keys, connections between said oscillator and the computing mechanism, comprising a rocking member and a connector pivoted thereto, said connector being engageable with and disengageable from said oscillator, and a spring for holding said connector in position to be driven by said oscillator, said spring being attached to said connector and to said rocking frame, the angle formed at the point of drive between the oscillator and said connector being a right angle, said last condition and the recited mode of attaching said spring both contributing to lessen the power required by said spring in holding the connector to its working position.

7. In a combined typewriting and computing machine, the combination with numeral keys, a carriage under control of said numeral keys, a shift key for determining the writing of upper and lower-case characters by said numeral keys, computing mechanism, connecting mechanism under the control of said keys for actuating said computing mechanism, an oscillator forming part of said connecting mechanism and actuated variable amounts, according to the digital values of said keys, connections between said oscillator and the computing mechanism, comprising a rocking member and a connector pivoted thereto, said connector being engageable with and disengageable from said oscillator, a spring for holding said connector in position to be driven by said oscillator, said spring being attached to said connector and said rocking member, and a connection from the shift key to the connector to disconnect the computing mechanism during the shift to upper-case characters, the said mode of attaching said spring contributing to ease of action of said shift key.

8. In a combined typewriting and computing mechanism, the combination with numeral keys and alphabet keys, a traveling carriage and an escapement therefor controlled by both said keys, computing mechanism, and actuating means therefor, engageable with and disengageable from said computing mechanism under control of the numeral keys only and a part of the escapement mechanism.

9. In a combined typewriting and computing machine, the combination of computing mechanism, actuating means therefor, a traveling carriage, an escapement therefor, numeral keys controlling said escapement, a normally ineffective connection between the escapement and actuating means, and means for establishing said connection brought into action by said numeral keys.

10. In a combined typewriting and computing machine, the combination of computing mechanism, actuating means therefor, a traveling carriage, an escapement therefor, numeral keys controlling said escapement, a lost-motion connection between the escapement and actuating means, and means called into action on the operation of a numeral key for taking up such lost-motion.

11. A combined typewriting and computing machine having numeral keys, computing mechanism, a traveling carriage, an escapement therefor under control of said keys, and actuating means for the computing mechanism, said means adapted to be controlled as to its effectiveness on said computing mechanism at each letter-space interval by said escapement mechanism; and comprising, in combination, means under control of the numeral keys for determining the activity of the escapement to control the effectiveness of the actuating means on said computing mechanism.

12. A combined typewriting and computing machine having numeral keys, computing mechanism, a traveling carriage, an escapement therefor under control of said keys; and actuating means for the computing mechanism, said means adapted to be controlled as to its effectiveness on said computing mechanism at each letter-space interval by said escapement mechanism; and comprising, in combination, an interponent movable into the path of a part of said escapement mechanism to render said escapement active in the control of said actuating means.

13. A combined typewriting and computing machine having numeral keys, computing mechanism, a traveling carriage, an escapement therefor under control of said keys, and actuating means for the computing mechanism; said means adapted to be controlled as to its effectiveness on said computing mechanism at each letter-space interval by said escapement mechanism; and comprising, in combination, an interponent movable into the path of a part of said escapement mechanism to render said escapement active in the control of said actuating means; and means for so moving said interponent controlled by the numeral keys.

14. A combined typewriting and computing machine having numeral keys, computing mechanism, a traveling carriage, an escapement therefor under control of said keys, and actuating means for the computing mechanism, said means adapted to be controlled as to its effectiveness on said computing mechanism at each letter-space interval by said escapement mechanism; and comprising, in combination, differentiators carried by the numeral keys for controlling the differential movement of the computing mechanism according to the digital values of the keys, and means controlled by the differentiators for determining the activity of the escapement to control the effectiveness of the actuating means on said computing mechanism.

15. A combined typewriting and computing machine having numeral keys, computing mechanism, a traveling carriage, an escapement therefor under control of said keys, and actuating means for the computing mechanism, said means adapted to be controlled as to is effectiveness on said computing mechanism at each letter-space interval by said escapement mechanism; and comprising, in combination, differentiators carried by the numeral keys for controlling the differential movement of the computing mechanism according to the digital values of the keys, an interponent movable into the path of a part of said escapement mechanism to render said escapement active in the control of said actuating means, and means for so moving said interponent by said differentiators.

16. A combined typewriting and computing machine having numeral keys, computing mechanism, a traveling carriage, an escapement therefor under control of said keys, and actuating means for the computing mechanism, said means adapted to be controlled as to its effectiveness on said computing mechanism at each letter-space interval by said escapement mechanism; and comprising, in combination, an interponent movable into the path of a part of said escapement mechanism to render said escapement active in the control of said actuating means, a link connected to said interponent, and connections from said numeral keys to said link.

17. A combined typewriting and computing machine having numeral keys, computing mechanism, a traveling carriage, an escapement therefor under control of said keys, and actuating means for the computing mechanism, said means adapted to be controlled as to its effectiveness on said computing mechanism at each letter-space interval by said escapement mechanism; and comprising, in combination, a slotted link, a pin moved by a part of the escapement mechanism, and an interponent movable into the path of said pin, so that the movement of the aforesaid part of the escapement may move said link to control the effectiveness of the actuating means on said computing mechanism.

18. A combined typewriting and computing machine having numeral keys, computing mechanism, a traveling carriage, an escapement therefor under control of said keys, and actuating means for the computing mechanism, said means adapted to be controlled as to its effectiveness on said computing mechanism at each letter-space interval by said escapement mechanism; and comprising, in combination, a slotted link, a pin moved by a part of the escapement mechanism, an interponent movable into the path of said pin, so that the movement of the aforesaid part of the escapement may move said link to control the effectiveness of the actuating means on said computing mechanism, and means controlled from the numeral keys for moving said interponent into the path of said pin.

19. A combined typewriting and computing machine having alphabet and numeral keys, computing mechanism, a traveling carriage, an escapement therefor under control of said keys, and actuating means for the computing mechanism, controlled as to its effectiveness on said computing mechanism at each letter-space interval by said escapement mechanism; and comprising, in combination, a lock for said alphabet keys, and means brought into action by any numeral key for controlling the effectiveness of said lock and the activity of said escapement to control the effectiveness of the actuating means on said computing mechanism.

20. A combined typewriting and computing machine having alphabet and numerling said escapement by the operation of a numeral key.

30. In a combined typewriting and computing machine, the combination with computing mechanism, a space key, numeral keys controlling said computing mechanism, a traveling carriage, an escapement mechanism for said carriage under control of said numeral keys and said space key, and means for preventing the space key from controlling said escapement brought into action by the operation of a numeral key, said means comprising a member moved directly by a numeral key to lock the space key.

31. In a combined typewriting and computing machine, the combination with computing mechanism, a space key, numeral keys controlling said computing mechanism, a traveling carriage, an escapement mechanism for said carriage under control of said numeral keys and said space key, and means for preventing the space key from controlling said escapement brought into action by the operation of a numeral key, said means comprising a lug on the space key, a swinging bail adapted to engage said lug, and means for directly swinging said bail by a numeral key.

32. In a combined typewriting and computing machine, the combination with computing mechanism, a space key, numeral and alphabet keys, said numeral key controlling said computing mechanism, a carriage, an escapement for said carriage under control of any of the above-mentioned keys, and means for preventing said alphabet keys and said space key from controlling said escapement on the operation of a numeral key and comprising projections carried by the alphabet keys, a lug carried by the space key, a locking bar adapted to move under the projections carried by the alphabet keys, a locking bail adapted to engage said lug on said space key, and means for positively moving both said locking bar and said bail by a numeral key.

33. The combination of a support having two sets of engageable means thereon, a totalizer carried thereby, and securing means therefor, comprising a latch having portions to engage said engageable means to secure the totalizer in different predetermined positions along said support.

34. The combination of a totalizer and a support, said support having engageable means thereon and said totalizer having a part coöperating with said engageable means to hold the totalizer against lateral movement on the support, and a latching means for clamping the totalizer against movement transverse of said support, said latching means also controlling said part which coöperates with said engaging means.

35. The combination of a totalizer and a support, said totalizer and support having universally engaging contacts enabling the totalizer to be positioned at any point on the support, and positively engaging contacts to secure the totalizer at predetermined points on said support.

36. The combination of a totalizer and a support, said totalizer and support having universally engaging contacts enabling the totalizer to be positioned at any point on the support, positively engaging contacts to secure the totalizer at predetermined points on said support, and a latch controlling said positively engaging contacts while leaving said universally engaging contacts unaffected.

37. In a combined typewriting and computing machine, the combination of a typewriter carriage, a totalizer support, and a pair of arms carried by the carriage and loosely embracing said support.

38. In a combined typewriting and computing machine, the combination of a typewriter carriage, a totalizer support, two arms carried by the carriage and engaging said support, and means for alining said support by adjustment of one of said arms.

39. In a combined typewriting and computing machine, the combination of a typewriter carriage, a totalizer support, and two arms carried by the carriage and engaging said support, one of said arms being pivoted and the other rigid, said pivoted arm carrying adjustable means, and the rigid arm carrying means coöperating with said support to effect proper adjustment in conjunction with said first-mentioned adjustable means.

40. A totalizer comprising a series of computing members, in combination, with an actuator for said members, said totalizer and actuator being relatively movable to determine a computing zone, and a universal bail for engaging and holding said members when the totalizer is out of the computing zone.

41. A totalizer comprising a series of computing members, spacing collars between said members to determine punctuation zones, and a locking bail for holding the members of the totalizer in alinement when the totalizer is out of the computing zone, said bail being carried by said spacing collars.

42. The combination of a shaft, totalizer wheels supported thereon, a locking bail for said totalizer wheels, and supports for said locking bail carried by said shaft.

43. The combination of a shaft, totalizer wheels supported thereon, a locking bail for said totalizer wheels, collars spaced along said shaft, so as to form punctuation spaces, and connections from said collars to said bail.

al keys, computing mechanism, a traveling carriage, an escapement therefor under control of said keys, and actuating means for the computing mechanism, controlled as to its effectiveness on said computing mechanism at each letter-space interval by said escapement mechanism; and comprising, in combination, a lock for said alphabet keys, comprising a bar movable to position for obstructing said keys, means brought into action by any numeral key for moving said bar to lock said keys, and connections from said bar to control the activity of said escapement to control the effectiveness of the actuating means on said computing mechanism.

21. A combined typewriting and computing machine having alphabet and numeral keys, computing mechanism, a traveling carriage an escapement therefor under control of said keys, and actuating means for the computing mechanism, controlled as to its effectiveness on said computing mechanism at each letter-space interval by said escapement mechanism; and comprising, in combination, means actuated on a partial depression of a numeral key for moving said actuating means to compute, and means acting under the joint control of a part of said escapement mechanism and the key during its further depression for controlling the effectiveness of said actuating means on said computing mechanism.

22. A combined typewriting and computing machine having numeral keys, computing mechanism, a traveling carriage, an escapement therefor under control of said keys, and actuating means for said computing mechanism normally engaging said computing mechanism; and comprising, in combination, means acting on a partial depression of a numeral key for moving said actuating means to compute, and means acting under the joint control of a part of said escapement mechanism and the key during its further depression for disengaging said actuating means from the computing mechanism.

23. In a combined typewriting and computing machine, the combination of computing mechanism, numeral and alphabet keys, said numeral keys controlling said computing mechanism, a carriage adapted to carry a work-sheet, an escapement for said carriage, under control of any of said keys, means engaging the carriage and preventing any movement thereof during the operation of a numeral key, and means preventing the printing of any character on the work-sheet during said operation, except the character represented by the numeral key operated.

24. In a combined typewriting and computing machine, the combination of computing mechanism, a space key, numeral and alphabet keys, said numeral keys controlling said computing mechanism, a carriage adapted to carry a work-sheet, an escapement for said carriage under control of any of the above-mentioned keys, and means for preventing any movement of said carriage either by the space key, the alphabet keys or any other numeral key during the operation of any numeral key, and for preventing the printing of any character on the work-sheet during said operation, except the character represented by the numeral key operated.

25. In a combined typewriting and computing machine, the combination of computing mechanism, alphabet and numeral keys, a carriage adapted to carry a work-sheet, said numeral keys controlling said computing mechanism, and both said numeral and alphabet keys controlling the printing of characters on the work-sheet, and means brought into action by depression of a numeral key for preventing printing by an alphabet key during operation of said numeral key.

26. In a combined typewriting and computing machine, the combination of computing mechanism, alphabet and numeral keys, a traveling carriage, an escapement mechanism therefor, said numeral keys controlling said computing mechanism, and both said numeral and alphabet keys controlling said escapement mechanism, and means brought into action by depression of a numeral key for preventing control of said escapement by an alphabet key during operation of a numeral key.

27. In a combined typewriting and computing machine, the combination of computing mechanism, numeral and alphabet keys, differentiators carried by the numeral keys for controlling said computing mechanism, and means brought into action under control of any of said differentiators, for locking the alphabet keys against movement.

28. In a combined typewriting and computing machine, the combination of computing mechanism, numeral and alphabet keys, differentiators carried by said numeral keys, for controlling said computing mechanism, each differentiator having a nose, and means brought into action by said differentiators through the medium of any one of said noses to prevent operation of the alphabet keys.

29. In a combined typewriting and computing machine, the combination with computing mechanism, a space key, numeral keys controlling said computing mechanism, a traveling carriage, an escapement mechanism for said carriage under control of said numeral keys and said space key, and means for preventing the space key from control- 44. The combination of a shaft, totalizer wheels supported thereon, a locking bail for said totalizer wheels, collars spaced along said shaft so as to form comma spaces and decimal point spaces, and connections from said collars supporting said bail.

45. The combination of a shaft, totalizer wheels carried thereby, a locking bail for said totalizer wheels, spacing collars having portions concentric with said wheels to form a continuous surface, having the appearance of blank dial-wheels or partitions of the totalizer, and means for supporting said bail from said spacing collars.

46. A dial-wheel having a hub portion and a portion adapted to carry numerals, the numeral portion being of less extent longitudinally than the hub portion, in order to avoid frictional contact between the dial-wheels at their peripheries when a plurality are placed adjacent each other.

47. The combination of a dial-wheel and a toothed wheel adapted to drive the same, said dial-wheel having blocks formed at its periphery and adapted to carry numerals, the space between adjacent blocks being formed so as to be equal to the space between the teeth on said engaging wheel.

48. In a combined typewriting and computing machine, the combination of computing mechanism, a traveling carriage, an escapement therefor, keys controlling the computing mechanism and said carriage escapement, tabulator keys, also controlling said carriage, and means for preventing the numeral keys from being actuated during the movement of the carriage under control of the tabulator keys.

49. In a combined typewriting and computing machine, the combination of computing mechanism, a traveling carriage, an escapement therefor, keys controlling the computing mechanism and said carriage escapement, tabulator keys, also controlling said carriage, means for preventing simultaneous depression of two numeral keys, and means brought into action by a tabulator key for preventing operation of any numeral key, said means acting through the medium of said first-mentioned means.

50. In a combined typewriting and computing machine, the combination of computing mechanism, a traveling carriage, an escapement therefor, keys controlling the computing mechanism and said carriage escapement, tabulator keys, also controlling said carriage, a series of hinges for preventing the simultaneous depression of two numeral keys, and means for preventing operation of any numeral key when a tabulator key is operated, through the medium of said hinges.

51. In a combined typewriting and computing machine, the combination of computing mechanism, a traveling carriage, an escapement therefor, keys controlling the computing mechanism and said carriage escapement, tabulator keys, also controlling said carriage, a series of hinges, a part carried by each numeral key to be interposed between said hinges to prevent the simultaneous depression of two numeral keys, and means brought into operation by any tabulator key for interposing a member between said hinges to prevent operation of any numeral key while a tabulator key is in depressed position.

52. A computing machine having computing mechanism and a bichrome printing mechanism; and comprising, in combination, means for silencing the computing mechanism and for enabling the printing of numerals in either color in the computing zone.

53. A computing machine having computing mechanism, said computing mechanism having an active and a passive state, printing mechanism, and keys controlling both the computing mechanism and the printing mechanism; the combination comprising a bichrome mechanism shiftable to print numerals in either color under control of said keys while said computing mechanism is in either of said states.

54. A computing machine having computing mechanism, said mechanism having an active state and a passive state and also having an adding and a subtracting state; the combination comprising a bichrome printing mechanism settable to print numbers in one color for the adding state and in the other color for the subtracting state during the active state of said computing mechanism, and means for enabling said bichrome mechanism to print in either color while said computing mechanism is in a passive state.

55. A computing machine having computing mechanism, a numeral printing mechanism, and a shiftable bichrome mechanism; and comprising, in combination, means for enabling the printing of numerals in either color in a computing zone, said means comprising mechanism for silencing the computing mechanism independently of the bichrome shift.

56. The combination with computing mechanism, of actuating means therefor, numeral keys for controlling the movements of said means, a carriage adapted to carry a work-sheet upon which printing may be done by said keys, a case-shift mechanism, means for rendering the connections between the numeral keys and the actuating means ineffective on shifting the case, and manual means acting on the said connections to render them ineffective at will, and independent of the case-shifting mechanism.

57. In a computing machine, the combination with numeral keys, computing mechanism, differential mechanism for operating said computing mechanism under the control of said keys and comprising a connector movable into and out of position to control the connection between the keys and computing mechanism, case-shifting means, means controlled thereby for moving said connector out of operative position, and manual means also acting on said connector and independent of the case-shifting means.

58. A combined typewriting and computing machine having numeral keys, computing mechanism, a traveling carriage, a case-shift mechanism for said carriage, and actuating means for the computing mechanism under the control of said keys; and comprising, in combination, a connector between the numeral keys and said actuating means, movable to and from operative position to determine the activity or non-activity of said keys on said computing mechanism, a pivoted lever adapted to be moved on operation of the case-shift to move said connector to ineffective position, and manual means operating to move said connector to ineffective position through the medium of said lever.

59. A combined typewriting and computing machine having numeral keys, computing mechanism, a traveling carriage, a case-shift mechanism for said carriage, and actuating means for the computing mechanism under the control of said keys; and comprising, in combination, a connector between the numeral keys and said actuating means, movable to and from operative position to determine the activity or non-activity of said keys on said computing mechanism, a pivoted lever adapted to be moved on operation of the case-shift to move said connector to ineffective position, manual means operating to move said connector to ineffective position through the medium of said lever, and connections between the case-shift and said lever and between the manual means and said lever, so that either the case-shift or the manual means may be moved to render said connector ineffective without affecting the other.

60. A computing machine having computing mechanism, numeral keys controlling said computing mechanism, and state-controlling mechanism for determining whether said computing mechanism shall add or subtract under control of said keys; and comprising, in combination, means for rendering said keys ineffective to control said computing mechanism during shifting of said state-control mechanism from one position to another.

61. A computing machine having computing mechanism, numeral keys controlling said computing mechanism, and state-controlling mechanism for determining whether said computing mechanism shall add or subtract under control of said keys; and comprising, in combination, means for rendering said keys ineffective to control said computing mechanism during shifting of said state-control mechanism from one position to another, but rendered effective on complete positioning of said state-controlling mechanism.

62. A computing machine having computing mechanism, numeral keys controlling said computing mechanism, and state-controlling mechanism for determining whether said computing mechanism shall add or subtract under control of said keys; and comprising, in combination, means to prevent a simultaneous depression of two numeral keys, and means brought into action during the shifting of said state-controlling mechanism for rendering all of said keys ineffective during said shifting, said means acting through the medium of said first-mentioned means.

63. A computing machine having computing mechanism, numeral keys controlling said computing mechanism, and state-controlling mechanism for determining whether said computing mechanism shall add or subtract under control of said keys; and comprising, in combination, a series of hinges, a part carried by each numeral key to be interposed between said hinges to prevent a simultaneous depression of two numeral keys, and means brought into operation during the shifting of said state-controlling mechanism for interposing a member between said hinges to prevent operation of any numeral key during said shifting.

64. A computing machine having computing mechanism, numeral keys controlling said computing mechanism, and state-controlling mechanism for determining whether said computing mechanism shall add or subtract under control of said keys; and comprising, in combination, a series of hinges, a part carried by each numeral key to be interposed between said hinges to prevent a simultaneous depression of two numeral keys, and means brought into operation during the shifting of said state-controlling mechanism for interposing a member between said hinges to prevent operation of any numeral key during said shifting, said member passing out from between said hinges on the complete shifting of said state-controlling mechanism to release said numeral keys.

65. A computing machine having computing mechanism, numeral keys controlling said mechanism, and bichrome mechanism for determining whether said keys shall print items in one color or another; and comprising means for rendering said keys ineffective to control said computing mechanism during the shifting of said bichrome mechanism from one position to another.

66. A computing machine having computing mechanism, numeral keys controlling said computing mechanism, and bichrome mechanism for printing the items in one color or another as computed by said keys, said bichrome mechanism also controlling the state of the computing mechanism as to addition and subtraction; and comprising means for rendering said keys ineffective to control said computing mechanism at a time when said bichrome mechanism is partly shifted and rendering said keys effective on a complete shifting thereof.

67. A computing machine having computing mechanism, numeral keys controlling said computing mechanism, bichrome mechanism for determining whether said keys shall print items in one color or another, and state-controlling mechanism, connected with said bichrome mechanism, said state-controlling mechanism determining the addition or subtraction state of said computing mechanism; and comprising means for rendering said keys ineffective to control said computing mechanism during the shifting of said bichrome mechanism, and during the change of state.

68. A computing machine having computing mechanism, numeral-printing keys controlling said mechanism, bichrome mechanism for determining the color of printing, and state-controlling mechanism for determining the addition or subtraction state of said computing mechanism; and comprising, in combination, means for insuring that the item printed in one state shall be in one color, while the item printed in the other state shall be in the other color, and means for insuring that no printing shall take place during the change from one color to another color.

69. A computing machine having computing mechanism, numeral-printing keys for controlling said mechanism, bichrome mechanism for determining the color of the printing, and state-controlling mechanism for controlling the addition or subtraction state of said computing mechanism; and comprising, in combination, means for insuring that the item printed in one state shall be in one color, while the item printed in the other state shall be in the other color, said means comprising a connection between the state-controlling mechanism and the bichrome mechanism, and means for insuring that no printing shall take place during the change from one color to another, said last-mentioned means comprising a lock for the numeral keys acting during said change.

70. The combination with computing mechanism and actuating means therefor, movable into and out of engagement therewith, of keys for writing numbers, a universal member operable by any key, said actuating means normally disconnected from said universal member, means to enable any key to connect said actuating means to said universal member, and means to enable said universal member to control the engagement and disengagement of said actuating means with said computing mechanism.

FREDERICK A. HART.

Witnesses:
ARTHUR A. JOHNSON,
EDITH B. LIBBEY.

Copies of this patent may be obtained for five cents each, by addressing the "Commissioner of Patents, Washington, D. C."